United States Patent
Bernsen

(10) Patent No.: US 12,107,965 B2
(45) Date of Patent: Oct. 1, 2024

(54) DATA ENCRYPTION AND INTEGRITY VERIFICATION

(71) Applicant: KONINKLIJKE PHILIPS N.V., Eindhoven (NL)

(72) Inventor: Johannes Arnoldus Cornelis Bernsen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 619 days.

(21) Appl. No.: 17/252,303

(22) PCT Filed: Jun. 17, 2019

(86) PCT No.: PCT/EP2019/065791
§ 371 (c)(1),
(2) Date: Dec. 15, 2020

(87) PCT Pub. No.: WO2019/243209
PCT Pub. Date: Dec. 26, 2019

(65) Prior Publication Data
US 2021/0266175 A1    Aug. 26, 2021

(30) Foreign Application Priority Data
Jun. 18, 2018 (EP) .................................... 18178252

(51) Int. Cl.
*H04L 9/32* (2006.01)
*H04L 9/06* (2006.01)
(Continued)

(52) U.S. Cl.
CPC .......... *H04L 9/3242* (2013.01); *H04L 9/0643* (2013.01); *H04L 9/0861* (2013.01); *H04L 9/3247* (2013.01); *H04L 9/12* (2013.01)

(58) Field of Classification Search
CPC ... H04L 9/3242; H04L 9/0643; H04L 9/0861; H04L 9/3247; H04L 9/12; H04L 9/06;
(Continued)

(56) References Cited

U.S. PATENT DOCUMENTS

| 6,055,316 A | * | 4/2000 | Perlman | ................ H04L 9/0637 380/262 |
| 7,248,833 B2 | * | 7/2007 | Lee | ........................ H04L 9/0662 455/552.1 |

(Continued)

FOREIGN PATENT DOCUMENTS

| CN | 106789053 A | * | 5/2017 | ............... H04L 9/14 |
| CN | 105553981 B | * | 3/2019 | ......... H04L 63/0869 |

(Continued)

OTHER PUBLICATIONS

KR 101663274 B1_ Encryption Device, Decryption Device and System for Performing Padding in Blockcipher Mode (Machine Translation) by Baekjun Choi and Do Seung-geun; p. 6 Date Published: Oct. 7, 2016.*

(Continued)

*Primary Examiner* — Harunur Rashid
*Assistant Examiner* — Ali H. Cheema

(57) ABSTRACT

A device is arranged for encrypting input data and protecting integrity of the input data and associated data. An encryption processor has a first hash unit arranged to compute an integrity value based on the input data, a second hash unit arranged to compute an initialization vector based on the integrity value and associated data, producing an initialization vector that is different from the integrity value. At least one of the hash units may be a keyed hash unit. An encryption unit is arranged for encrypting the input data to generate encrypted data using the initialization vector and an encryption key. As the initialization vector depends on both the integrity value and the associated data, any change (Continued)

therein will result in failure of the decryption and decrypted data that are substantially different from the original input data.

21 Claims, 14 Drawing Sheets

(51) Int. Cl.
*H04L 9/08* (2006.01)
*H04L 9/12* (2006.01)

(58) Field of Classification Search
CPC ..... H04L 9/3236; H04L 63/12; H04L 63/123; H04L 63/0435; G06F 21/602
USPC .......................................... 713/168, 176, 184
See application file for complete search history.

(56) References Cited

U.S. PATENT DOCUMENTS

| | | | | |
|---|---|---|---|---|
| 8,189,769 | B2 * | 5/2012 | Ramasamy | H04L 9/0637 380/37 |
| 9,596,218 | B1 * | 3/2017 | Billock | H04L 69/22 |
| 9,892,211 | B2 * | 2/2018 | Yoshino | G06F 16/7837 |
| 2008/0170691 | A1 * | 7/2008 | Chang | H04L 63/062 380/28 |
| 2010/0293372 | A1 * | 11/2010 | Fischer | H04W 12/06 380/278 |
| 2011/0238989 | A1 * | 9/2011 | Machani | H04L 9/3242 713/168 |
| 2012/0159175 | A1 * | 6/2012 | Yocom-Piatt | G06F 11/1453 713/176 |
| 2013/0073850 | A1 * | 3/2013 | Zaverucha | H04L 9/0869 713/168 |
| 2014/0032922 | A1 * | 1/2014 | Spilman | G06F 21/602 713/184 |
| 2016/0285779 | A1 * | 9/2016 | Commons | G06F 21/577 |
| 2016/0344549 | A1 * | 11/2016 | Campagna | H04L 9/0637 |
| 2018/0069695 | A1 * | 3/2018 | Bowman | H04L 9/0841 |
| 2018/0176014 | A1 * | 6/2018 | Campagna | H04L 9/0637 |
| 2018/0294968 | A1 * | 10/2018 | Johnson | H04L 9/3239 |
| 2019/0132120 | A1 * | 5/2019 | Zhang | H04L 63/0428 |

FOREIGN PATENT DOCUMENTS

| | | | | |
|---|---|---|---|---|
| KR | 100551992 | B1 * | 2/2006 | ........... H04L 9/0643 |
| KR | 101262844 | B1 * | 5/2013 | ............... H04L 9/08 |
| KR | 101663274 | B1 * | 10/2016 | |
| KR | 20180007459 | A * | 1/2018 | |
| WO | WO-2007059558 | A1 * | 5/2007 | ......... H04L 63/0428 |
| WO | WO-2016027454 | A1 * | 2/2016 | ........... H04L 9/0618 |

OTHER PUBLICATIONS

Palash Sarkar: "Modes of Operations for Ciphers Supporting an Initialisation Vector", International Association for Cryptologic Research,, vol. 20130709:112414,Jul. 9, 2013 (Jul. 9, 2013), pp. 1-40.
International Search Report and Written Opinion from PCT/EP2019/065791 mailed Jul. 9, 2019.
Dworkin, "Recommendation for Block Cipher Modes of Operation" NIST, Special Publication, Dec. 2001.
Harkins "Synthetic Initialization Vector (SIV) Authenticated Encryption Using the Advanced Encryption Standard" Oct. 2008.
Eastlake "US Secure Hash Algorithms " Internet Engineering Task Force May 2011.
Barker "Recomendation for the Triple Data Encryption Algorithm (TDEA) Block Cipher" NIST Special Publication 800-67 Nov. 2017.
Diffie, W.; Hellman, M. (1976), "New directions in cryptography", IEEE Transactions on Information Theory, 22 (6): 644-654.
"Digital Signature Standard (DSS)", USA, National Institute of Standards and Technology, Federal Information Processing Standard (FIPS) 186-4.
Phillip Rogaway, "Evaluation of Some Blockcipher Modes of Operation", University of California, Davis, Feb. 10, 2011.
Krawczyk et al "HMAC: Keyed-Hashing for Message Authentication", Network Working Group Feb. 1997.
S. Kelly "Using HMAC-SHA-256, HMAC-SHA-384, and HMAC-SHA-512 with IPsec", Network Working Group May 2007.
Synthetic Initialization Vector (SIV) Authenticated Encryption Using the Advanced Encryption Standard (AES), Oct. 2008, (https://datatracker.ietf.org/doc/rfc5297/ ).
US Secure Hash Algorithms (SHA and SHA-based HMAC and HKD, May 2011, (https://datatracker.ietf.org/doc/rfc6234/ ).
Dworkin, M., "Recommendation for block cipher modes of operation: The XTS-AES mode of confidentiality on storage devices", NIST Special Publication 800-38E, Jan. 2010.

* cited by examiner

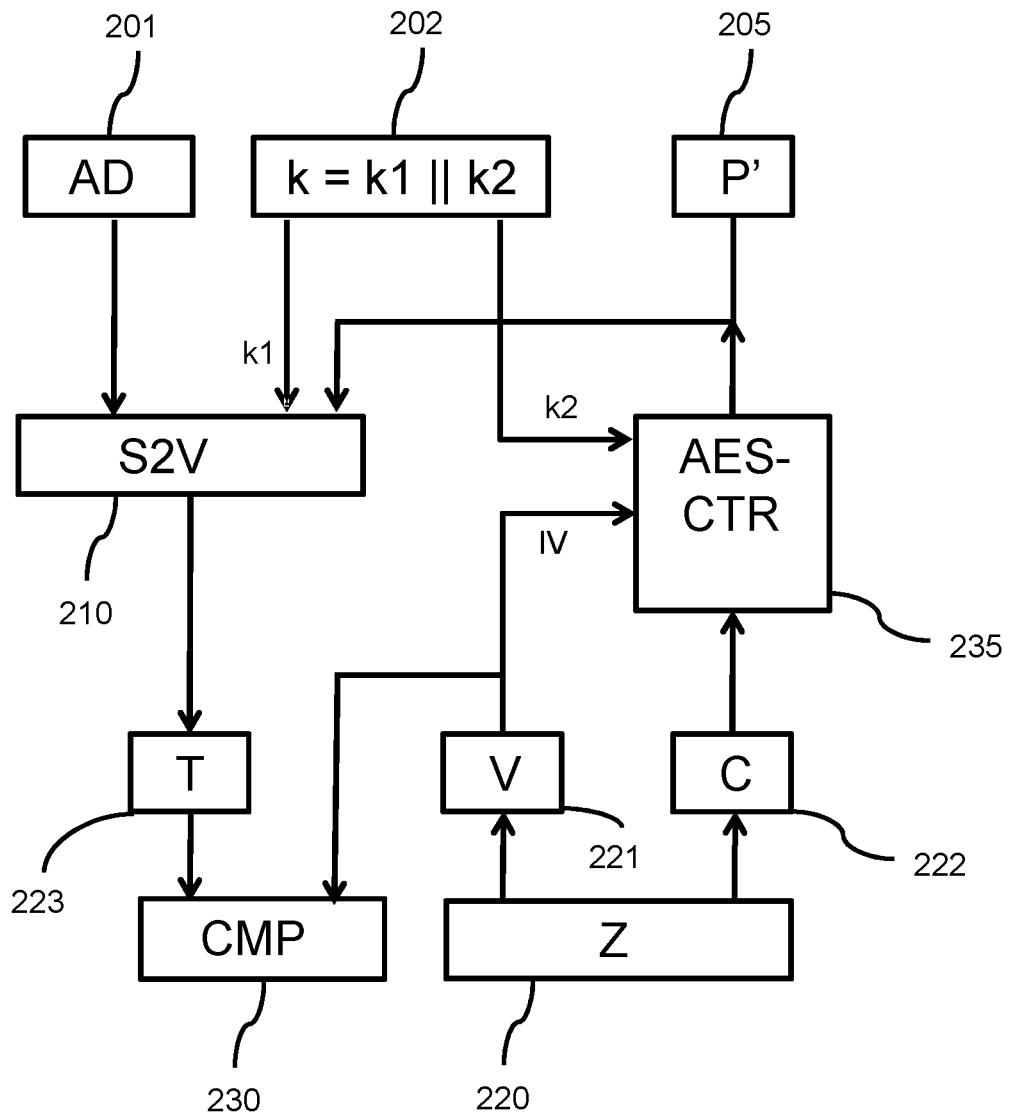
PRIORART
Fig. 3

DATA ENCRYPTION AND INTEGRITY VERIFICATION

CROSS-REFERENCE TO PRIOR APPLICATIONS

This application is the U.S. National Phase application under 35 U.S.C. § 371 of International Application No. PCT/EP2019/065791, filed on Jun. 17, 2019, which claims the benefit of EP Patent Application No. EP 18178252.5, filed on Jun. 18, 2018. These applications are hereby incorporated by reference herein.

FIELD OF THE INVENTION

The invention relates to encryption and decryption of data having also associated data that is not to be encrypted.

The present invention relates to the field of data communication and storage, and more in particular provides devices and methods for encrypting data and protecting integrity of the data and associated data, and correspondingly decrypting, as well as corresponding computer program products.

BACKGROUND OF THE INVENTION

When devices need to secure their communication or data storage, they usually encrypt their communication. Thereto, encryption algorithms are important, because they can keep data private. Only when one has the decryption key, the plaintext of encrypted data can be obtained by decryption. However, not only secrecy, or privacy, is important, but also the integrity of a message. A message that is encrypted might be changed by an attacker, by changing, deleting or adding ciphertext symbols. Changes in the ciphertext may lead to gibberish after decryption, but a clever attacker using knowledge of the cipher and some encrypted examples may succeed to manipulate the data. For example, if an attacker has the encrypted version of a message from one bank to another which contains the instruction to transfer a certain amount of money to the attacker's account and if the attacker knows that the cypher text symbols n to m contain his bank account number, the attacker may capture another such message in which an amount is transferred to somebody else's bank account and change its ciphertext symbols n to m with the ciphertext symbols of the attacker's bank account number. Decryption may then produce a money transfer instruction that looks correct. In practice, it will be much more difficult to change ciphertext without knowing the decryption key such that a meaningful message is produced after decryption, but it is possible.

In view of the above attacks, integrity protection is added to encryption, for example by computing a message authentication code (MAC) over the plaintext data before encryption and encrypting the resulting MAC as well or by computing a MAC over the ciphertext after encryption and adding the resulting MAC to the message. A message authentication code is a short piece of information used to authenticate a message—in other words, to confirm that the message came from the stated sender and has not been changed. MAC algorithms are designed such that if just any one bit of the message is changed, many, preferably approximately half of the bits of the MAC change. A secret key is needed to create the MAC. If the recipient of a message has the MAC, the MAC key and the decryption key, he can verify that the message has not been tampered with, that the message has been sent by somebody knowing the MAC key and he can decrypt it. A well-known family of MAC algorithms are the keyed-hash message authentication code (HMAC) algorithms, such as HMAC-SHA256, HMAC-SHA384 and HMAC-SHA512, see [RFC 6234].

There also exist ciphers that combine encryption and integrity protection. AES-SIV (Synthetic Initialization Vector (SIV) Authenticated Encryption Using the Advanced Encryption Standard (AES), see [RFC 5297]) is an example of this. One half of the bits of the key used for AES-SIV is used for encryption/decryption, while the other half of the bits is used for authentication and integrity protection. This means e.g. that 128-bit AES encryption is done by AES-SIV when a 256-bit key is used for AES-SIV. Also, the authenticity and integrity of associated data (AD) in AES-SIV may be checked. That means that two sets of data can be input to AES-SIV before encryption, data that needs to be encrypted and associated data that is not encrypted, but for both of which authenticity and integrity can be proven by AES-SIV decryption and integrity checking. Ciphers that support this possibility are sometimes called Authenticated Encryption schemes with Associated Data (AEAD).

The receiver of the encrypted data and the associated data has to input both to AES-SIV for decryption. AES-SIV decrypts the ciphertext and inputs the decrypted ciphertext and the associated data to the integrity check for confirming integrity and authenticity. If this check fails, the decrypted ciphertext must be discarded. This check will fail if at least one of the bits of the encrypted data or the AD has been changed between sender and receiver.

For example, changing at least one of the bits of the encrypted data will lead to a failed authenticity/integrity check. In this case, the decrypted ciphertext is different from the plaintext that the sender wanted to protect. Changing at least one of the bits of the associated data will also lead to a failed authenticity/integrity check.

SUMMARY OF THE INVENTION

In the above AEAD ciphers, if some of the AD has been changed while the encrypted data has been maintained unchanged, the decrypted ciphertext is identical to the plaintext that the sender wanted to protect. Although the AES-SIV specification demands that the decrypted result is discarded, applications may fail to do that for some reason and use the decrypted data anyway, which decrypted data is equal to the original plaintext. Plaintext means unencrypted data or information, i.e. input for encryption into a cryptographic algorithm or output from decryption, and ciphertext means encrypted data or information, i.e. output of a cryptographic algorithm from encryption or input for decryption, It is an object of the invention to provide methods and devices for encrypting input data and protecting integrity of the input data and associated data, which avoids making available the original plaintext after decryption when the associated data has been manipulated.

For this purpose, devices and methods are provided as defined in the appended claims. According to an aspect of the invention an encryption method is provided as defined in claim 1. According to a further aspect of the invention there is provided a decryption method as defined in claim 11. According to a further aspect of the invention an encryption device is provided as defined in claim 16. According to a further aspect of the invention there is provided a decryption device as defined in claim 18. According to a further aspect of the invention there is provided a computer program product downloadable from a network and/or stored on a computer-readable medium and/or microprocessor-executable medium, the product comprising program code instructions for implementing the above methods when executed on a computer.

The features of the encryption and decryption methods and devices for encrypting input data and protecting integrity of the input data and associated data have the following effect.

The encryption process comprises computing an integrity value based on the input data using a first hash function. So, due to the first hash function, the integrity value is linked to the plain input data, while the same integrity value cannot be achieved after manipulating the plaintext. Also, the process comprises computing an initialization vector based on the integrity value and the associated data using a second hash function. So, due to the second hash function, the initialization vector is linked to the associated data, while the same vector cannot be achieved after manipulating the associated data or the integrity value. Effectively, the initialization vector will be different from the integrity value. Also, the encryption process comprises encrypting the input data to generate encrypted data using the initialization vector and an encryption key. Also, the encryption process comprises generating an output encrypted message comprising the encrypted data and a message integrity value based on the integrity value.

The decryption process comprises obtaining an encrypted message comprising the encrypted data and a message integrity value based on an integrity value. Also, the decryption process comprises computing an initialization vector based on the integrity value derived from the message integrity value and the associated data using a second hash function. The second hash function is equal to the second hash function used during encryption, so the initialization vector differs from the message integrity value and the integrity value. Also, the decryption process comprises decrypting the encrypted data to generate plaintext using the initialization vector and a decryption key, which key is secret and equal to the encryption key used during encryption. Alternatively, when a non-symmetrical encryption is applied, the encryption key and the decryption key constitute a cooperative key pair, e.g. a public key and a secret key. Also, the decryption process comprises computing a test integrity value based on the plaintext using a first hash function. The first hash function is equal to the first hash function used during encryption, so the test integrity value should be equal to the integrity value calculated during encryption as transferred via the encrypted message. Also, the decryption process comprises determining the integrity by comparing the test integrity value and the integrity value.

The message integrity value may be equal to the integrity value, or may be further protected, e.g. by encryption using a secret key. Advantageously, when a malicious party manipulates the associated data, decrypting of the transferred encrypted data will not result in the original plaintext. This is due to the initialization vector being different, as the vector is calculated based on the received associated data using the second hash function at the decryption side.

In an embodiment, the first hash function for computing the integrity value is a first keyed hash function using a first integrity key. Advantageously, the protection of the integrity value is enhanced as a malicious party will not know the secret first integrity key. Also, preferably different keys are used for different purposes, e.g. encryption purpose and integrity protection purpose.

In an embodiment, the second hash function for computing the initialization vector is a second keyed hash function using a second integrity key. Advantageously, the protection of the initialization vector is enhanced as a malicious party will not know the secret second integrity key.

In an embodiment, generating the output message comprises generating the message integrity value by encrypting the integrity value using a derived key, the derived key being generated based on the encrypted data using a third hash function. Advantageously, the protection of the integrity value is enhanced the transferred message now comprises an encrypted version of the integrity value. Moreover, a malicious party will be able to manipulate the derived key due to the third hash function that has the encrypted data as input. A single bit change in the encrypted data will, in the decryption process, result in a very different derived key, and therefore also in a very different integrity value and initialization vector. Hence the decryption will completely fail, i.e. the decrypted data will be very different from the plaintext that was encrypted by the sender, in addition to a failing integrity test. Optionally, the third hash function for generating the derived key is a third keyed hash function using a third integrity key, which further improves the protection of the integrity value.

A method according to the invention may be implemented on a computer as a computer implemented method, or in dedicated hardware, or in a combination of both. Executable code for a method according to the invention may be stored on a computer program product. Examples of computer program products include memory devices such as a memory stick, optical storage devices such as an optical disc, integrated circuits, servers, online software, etc. The computer program product may comprise non-transitory program code means stored on a computer readable medium for performing a method according to the invention when said program product is executed on a computer. In an embodiment, the computer program comprises computer program code means adapted to perform all the steps or stages of a method according to the invention when the computer program is run on a computer. Preferably, the computer program is embodied on a computer readable medium. There is provided a computer program product downloadable from a network and/or stored on a computer-readable medium and/or microprocessor-executable medium, the product comprising program code instructions for implementing a method as described above when executed on a computer.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

Further preferred embodiments of the devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which FIG. 3 shows decryption processing according to AES-SIV (prior art)

The figures are purely diagrammatic and not drawn to scale. In the Figures, elements which correspond to elements already described may have the same reference numerals.

DETAILED DESCRIPTION OF EMBODIMENTS

Figure 1:
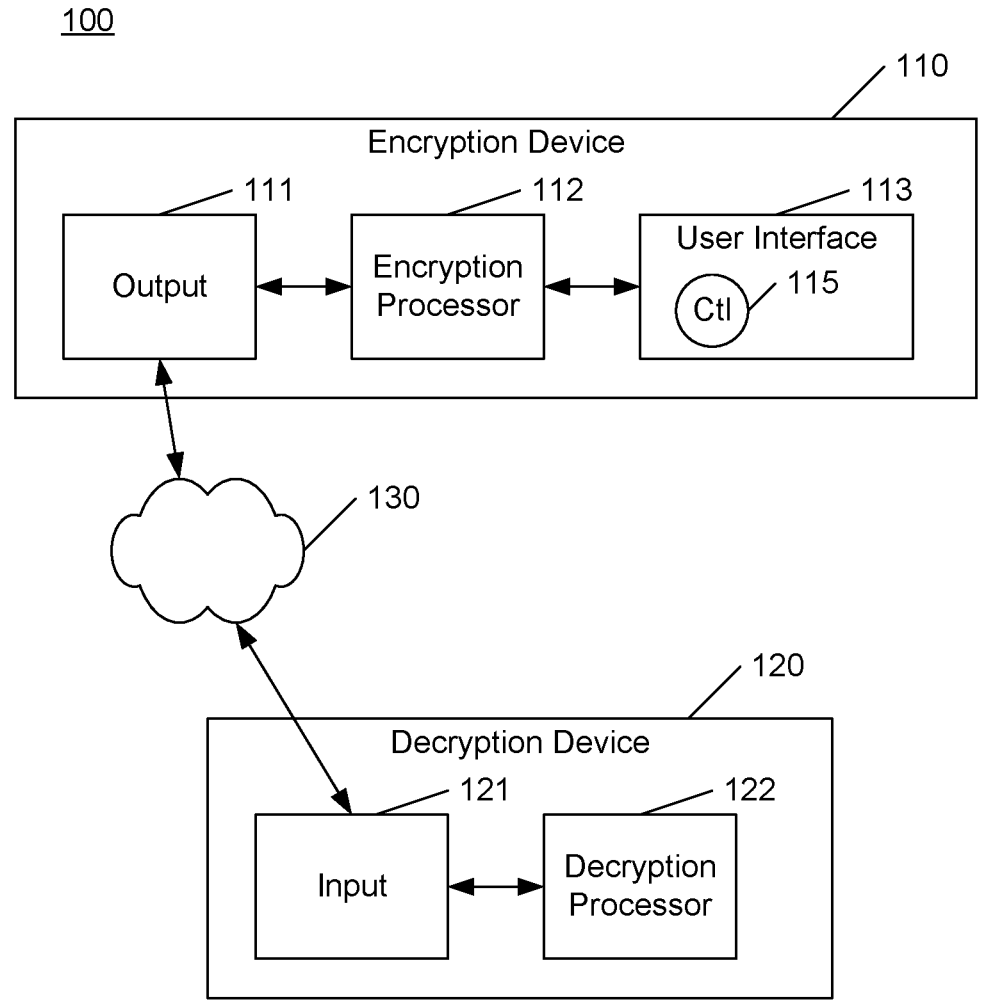
FIG. 1 shows devices for encrypting and decrypting data, and protecting integrity of the input data and associated data.

FIG. 1 shows devices for encrypting and decrypting data, and protecting integrity of the data and associated data. A system 100 for encrypting and decrypting data, and protecting integrity of the input data and associated data comprises an encryption device 110, and a decryption device 120. The devices are schematically indicated and may constitute peers with respect to the communication. However, similarly, devices may be configured in a master/slave system, a broadcast system, a storage or database system etc. Messages are exchanged between the devices to exchange the encrypted data, associated data and integrity values as elucidated below. Also, the devices may be physically apart or may be combined in a versatile device equipped to perform both the encryption and the decryption.

The encryption device 110 has an output unit 111 and an encryption processor 112. Likewise, the decryption device may have an input unit 121 and a decryption processor 122. The function of the encryption processor is further elucidated below with reference to FIGS. 4, 6, 8 and 10, and the function of the decryption processor is further elucidated below with reference to FIGS. 5, 7, 9 and 11.

The devices are arranged for inputting and outputting data in a predefined format, usually called messages, via a communication arrangement, as schematically indicated by shape 130 and arrows which connect the input and output units 111,121. The communication arrangement may for example be a network, broadcast system or storage device. The devices may be equipped for wired or wireless communication according to a communication protocol, or for storing and retrieving said messages. The input and output units 111,121 may be arranged to connect and further communicate according to a communication protocol, e.g. a wireless protocol to discover at least one other device and to connect to a discovered device for exchanging data.

In FIG. 1, the encryption device 110 may have a user interface 113 having at least one user control element 115. The decryption device 120 may be similarly equipped. For example, the user control element may comprise a touch screen, various buttons, a mouse or touch pad, etc. Buttons may be traditional physical buttons, touch sensors, or virtual buttons, e.g. on a touch screen or icons to be activated via a mouse. The user interface may also be a remote user interface.

Figure 2:
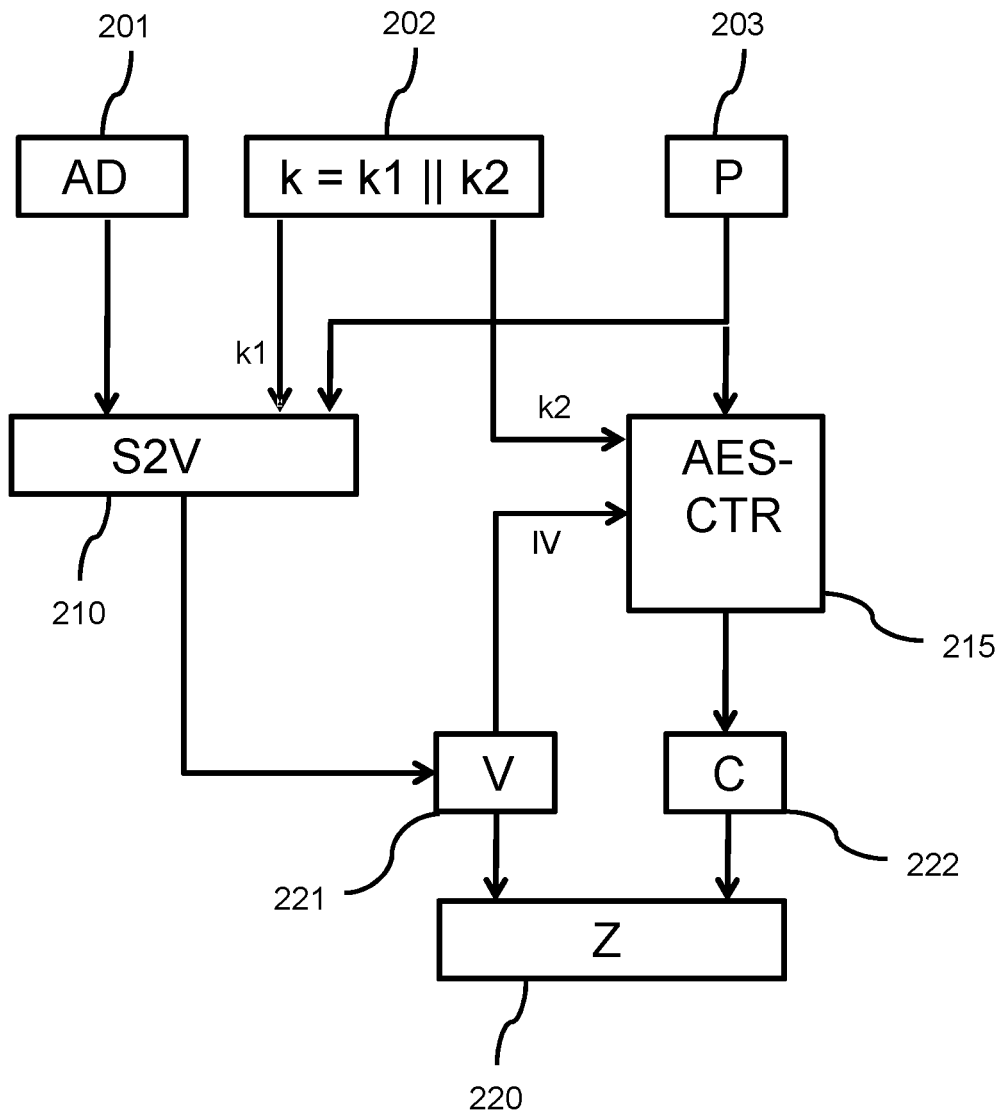
FIG. 2 shows encryption processing according to AES-SIV (prior art)

FIG. 2 shows a block diagram of AES-SIV encryption (prior art). In the Figure, unit P 203 is the plaintext input, unit AD 201 is the input for associated data, for example n vectors of associated data (AD1 . . . AD n). Unit K 202 is the key to be used for AES-SIV. It consists of two parts, K1 and K2; K1 is the key to be used for the authenticity/integrity check and K2 is the key to be used for encryption/decryption. The unit S2V 210 is a Pseudo-Random Function (PRF) using AES in Cipher-based Message Authentication Code ([CMAC]) mode. Its input consists of k1, AD and P. A detailed specification of S2V can be found in [RFC 5297]. S2V can be viewed as a specific keyed hash function. Unit V 221 stores the output of S2V, which is used as the Initialization Vector (IV) for encryption unit AES-CTR 215. V is also included in message Z 220, to be used as an authentication value during AES-SIV decryption.

The unit AES-CTR is a block that performs AES in counter mode, see [MODES]. K2 is the key and V is the initialization vector used by AES in counter mode. AES, or any other cipher, in counter mode works as follows. The cipher is used to generate as many multiples of the cipher block size (128 bit in case of AES) of pseudo-random data as necessary in order to be able to use this pseudo-random data as a key stream to XOR the message to be encrypted or decrypted with. The pseudo-random key stream is fully determined by the cipher, the initialization vector V and the key K. A 1-bit change in the initialization vector V or the key K will result in a change of approximately 50% of the bits of the key stream. The IV of any cipher in counter mode may consist of a random part and a counter part, or may consist of only a counter part. The key stream blocks after the first block are generated by incrementing the counter part of the IV. The length of the key stream is limited to the number of possibilities of the counter part of the IV. The encryption and decryption operation are the same operation, i.e. performing an XOR between the data stream and the key stream. The unit C 222 represents the encrypted data C, which is plaintext P encrypted by AES in counter mode. The message Z 220 is the AES-SIV output, which consists of the integrity value V combined with C.

The following properties of EAS-SIV can be determined by analyzing the block diagram of AES-SIV encryption in FIG. 2. Examples supporting this can be found in Table 1. The improved cipher as discussed below also possesses or improves these properties.

The first property (P1) is as follows. Because of the properties of Pseudo-Random Functions, so also of S2V, a change of at least one bit in the plaintext P will lead to many changed bits in the initialization vector V, so will also lead to many changed bits in C, the encrypted plaintext, see also case 2 in Table 1.

The second property (P2) is as follows. A change of at least one bit in any of the vectors of associated data AD will lead to many changed bits in the initialization vector IV (=integrity value V), so will also lead to many changed bits in C, the encrypted plaintext, see also case 3 in table 1.

The third property (P3) is as follows. According to FIG. 2, the plaintext P has to be processed in its entirety before encryption can begin, because all bits of the plaintext are used in the computation of the initialization vector of the block CTR, the encryption by AES in counter mode. This property is mentioned in [RFC 5297].

TABLE 1

Example results for AES-SIV encryption

| Case | P - plaintext in | AD | V - integrity value | C - encrypted out |
|---|---|---|---|---|
| Case 1<br>Test vectors<br>of A.1 of<br>[RFC 5297] | 11223344<br>55667788<br>99aabbcc ddee | 10111213<br>14151617<br>18191a1b<br>1c1d1e1f<br>20212223<br>24252627 | 85632d07 c6e8f37f<br>950acd32 0a2ecc93 | 40c02b96<br>90c4dc04<br>daef7f6a fe5c |
| Case 2<br>1-bit change<br>in P | 11223344<br>55677788<br>99aabbcc ddee<br>(1 changed bit) | 10111213<br>14151617<br>18191a1b<br>1c1d1e1f<br>20212223<br>2425262 | eeab761c 7dfaee24<br>9684596a 871d2d19<br>(123 changed bits) | 916157ca<br>11dd8177<br>c100cab5 5a89 |
| Case 3<br>1-bit change<br>in AD 1 | 11223344<br>55667788<br>99aabbcc ddee | 10011213<br>14151617<br>18191a1b<br>1c1d1e1f<br>20212223<br>24252627<br>(1 changed bit) | 9130e7bb 358730d8<br>898b9c36 1592ccb9<br>(119 changed bits) | 9347787e<br>890773a1<br>b073d851 fde3 |

The key used for encryption is from A.1 of [RFC 5297] (fffefdfc fbfaf9f8 f7f6f5f4 f3f2f1f0 f0f1f2f3 f4f5f6f7 f8f9fafb fcfdfeff)

FIG. 3 shows a block diagram of AES-SIV decryption (prior art). In the Figure, unit Z 220 is the input for AES-SIV decryption, which consists of the integrity value V combined with C, the encrypted data (plaintext P after encryption). Unit V 221 retrieves the integrity value V, which is used as Initialization Vector (IV) for AES decryption in unit AES-CTR 235. The integrity value V is also used to check the validity (integrity and authenticity) of C in comparator CMP 230. Unit C 222 retrieves the encrypted data C (which is the plaintext P as encrypted by AES in counter mode). Unit K 202 has the key to be used for AES-SIV, consisting of two parts, k1 and k2. k1 is the integrity key to be used for the authenticity/integrity check, while k2 is the key to be used for encryption/decryption.

The unit AES-CTR 235 is a block that performs AES decryption in counter mode, see [MODES], while k2 is the key and V is the initialization vector used by AES in counter mode. Unit P' 205 receives the plaintext output of the decryption from the block AES-CTR. The plaintext output may only be used if the validity check is positive. The unit AD has the associated data, which may be transferred with the message Z 220, or separately. Unit S2V 210 is the Pseudo-Random Function (PRF) using AES in Cipher-based Message Authentication Code ([CMAC]) mode, equal to the same unit S2V in FIG. 2. A test value T 223 is output of S2V and provided to the comparator CMP 230, where T is compared to the received V. If they are equal, the validity check is positive and the decrypted plaintext P' is identical to the plaintext P that was used during AES-SIV encryption. If T and V are not equal, AES-SIV fails and the decrypted plaintext P' must be discarded.

The following properties of EAS-SIV can be determined by analyzing the block diagram of AES-SIV decryption in FIG. 3. Examples supporting this can be found in Table 2.

The fourth property (P4) is as follows. Using the correct associated data AD, an unchanged initialization vector V and unchanged encrypted data C as input for AES-SIV decryption leads to decrypted plaintext P' that is identical to the plaintext P that was used during AES-SIV encryption. Furthermore, T equals V in this case so AES-SIV does not detect an authenticity/integrity fault in this case. See also case 4 in Table 2.

The fifth property (P5) is as follows. A change of any number of bits in the associated data AD used for the decryption of C, AES-SIV encrypted plaintext, leads still to decrypted plaintext P' that is identical to the plaintext P that was used during AES-SIV encryption. This is because the associated data has no influence on the inputs of the block CTR, decryption of C using AES in counter mode. However, AES-SIV does detect an authenticity/integrity fault in this case. See also case 5 in Table 2. So, in the known AES-SIV system the resulting plaintext P' is identical to P, which is a problem to be resolved by the improved cipher as discussed below.

The sixth property (P6) is as follows. A change in at least one of the bits of the initialization vector V used for the decryption of C, AES-SIV encrypted plaintext, leads to many bits in the decrypted plaintext P' that are different from the plaintext P that was used during AES-SIV encryption. This can be easily understood from the properties of AES in counter mode. AES-SIV detects an authenticity/integrity fault in this case. See also case 6 in Table 2.

The seventh property (P7) is as follows. A change in at least one of the bits of the encrypted input C for AES-SIV decryption leads to changes in the corresponding bits in the decrypted plaintext P' from the plaintext P that was used during AES-SIV encryption. This can be easily understood from the properties of AES in counter mode. AES-SIV detects an authenticity/integrity fault in this case. See also case 7 in Table 2.

TABLE 2

Example results for AES-SIV decryption

| Case | AD 1 used for decryption | V = IV used for decryption | C Encrypted input for decryption | P' Decrypted out | T = V |
|---|---|---|---|---|---|
| Case 4 No change in AD, V and C | 10111213 14151617 18191a1b 1c1d1e1f 20212223 24252627 | 85632d07 c6e8f37f 950acd32 0a2ecc93 | 40c02b96 90c4dc04 daef7f6a fe5c | 11223344 55667788 99aabbcc ddee (Identical to P) | Yes |
| Case 5 1-bit change in AD 1 | 10011213 14151617 18191a1b 1c1d1e1f 20212223 24252627 (1 changed bit) | 85632d07 c6e8f37f 950acd32 0a2ecc93 | 40c02b96 90c4dc04 daef7f6a fe5c | 11223344 55667788 99aabbcc ddee (Identical to P) | No |
| Case 6 1-bit change in V | 10111213 14151617 18191a1b 1c1d1e1f 20212223 24252627 | 85632d07 c6c8f37f 950acd32 0a2ecc93 (1 changed bit) | 40c02b96 90c4dc04 daef7f6a fe5c | d88f34a6 5a417f5b aa3ed7c9 ea1a (53 changed bits) | No |
| Case 7 1-bit change in C | 10111213 14151617 18191a1b 1c1d1e1f 20212223 24252627 | 85632d07 c6e8f37f 950acd32 0a2ecc93 | 40c02b96 90c4dc0c daef7f6a fe5c (1 changed bit) | 11223344 55667780 99aabbcc ddee (1 changed bit) | No |

The key used for encryption and decryption is from A.1 of [RFC 5297]. The plaintext P and AD 1 from A.1 of [RFC 5297] are used during encryption to produce the (unchanged) initialization vector V and encrypted input C.

Figure 4:
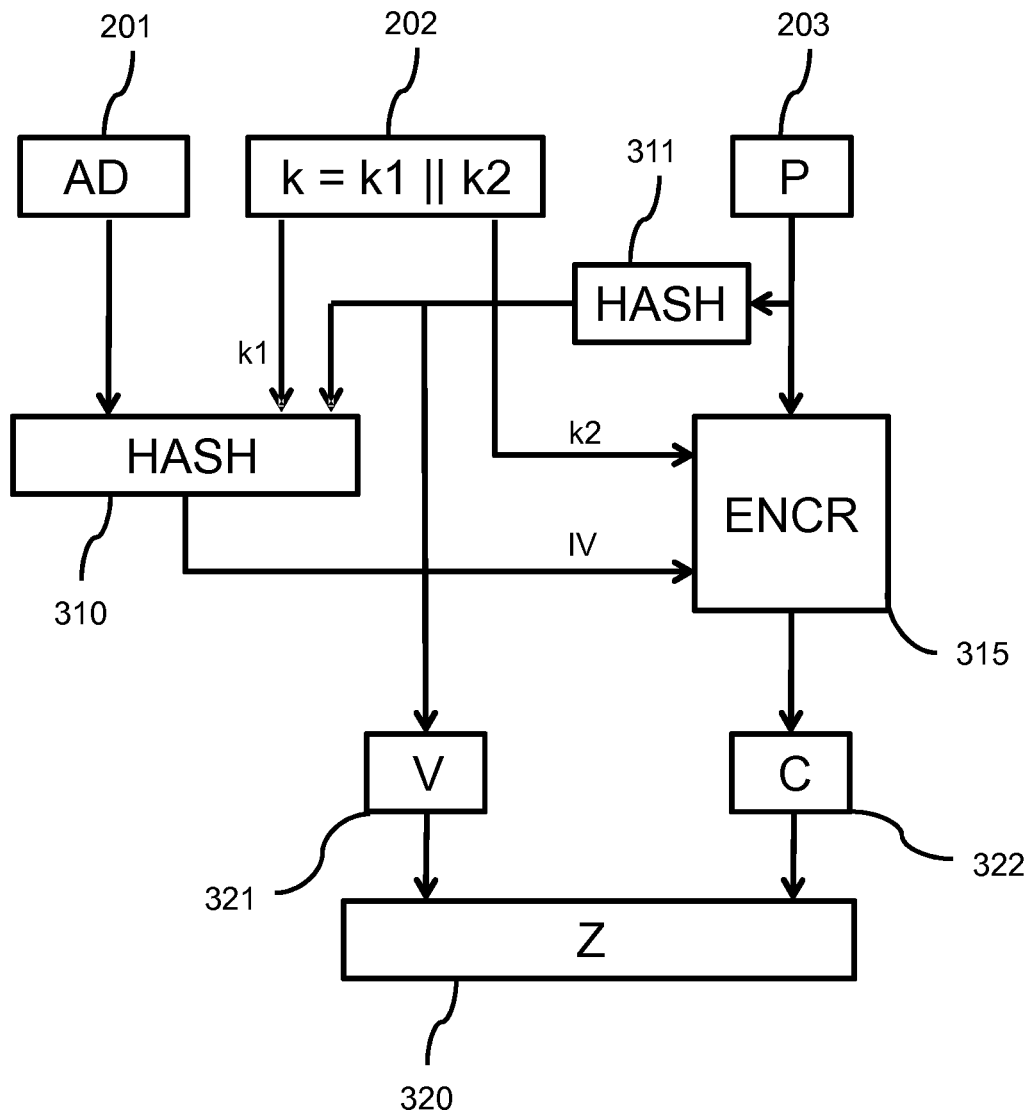
FIG. 4 shows a block diagram of enhanced encryption.

The enhanced ciphers as shown in FIG. 4 et seq. resolve the problem of AES-SIV mentioned with the fifth property (P5) above. A change of any number of bits in the associated data AD used for the decryption of C now leads to a decrypted plaintext P' that is different from the plaintext P that was used during encryption. This is because the associated data has direct influence on the initialization vector IV of the block ENCR, and similarly to decryption of C. Also, the enhanced cipher does detect an integrity fault in this case. So, in the enhanced system, the resulting plaintext P' is different from P when the associated data has been manipulated. Notably, the other properties as discussed above are maintained, or enhanced where so elucidated below.

FIG. 4 shows a block diagram of enhanced encryption. In the Figure, unit P 203 is the plaintext input, unit AD 201 provides the input for associated data, for example n vectors of associated data (AD1 . . . AD n). Unit K 202 is the key to be used, at least comprising the encryption key k2. It may also consist of two parts, k1 and k2; k1 is an integrity key that may be used for the integrity check and k2 is the key to be used for encryption/decryption. The unit HASH 310 is a hash function, e.g. a Pseudo-Random Function using AES in Cipher-based Message Authentication Code ([CMAC]) mode or HMAC_SHA256, HMAC_SHA384, or HMAC_SHA512 [RFC 4868] in case k1 is used, or an ordinary hash function like SHA256, SHA384 or SHA512, see [RFC 6234] when k1 is not used. The output of HASH unit 310 is used as the Initialization Vector (IV) for encryption unit ENCR 315, which generates the encrypted data C 322 based on the encryption key k2. An example of a suitable encryption is AES in counter mode as discussed above, which is one of the many ciphers that may be chosen here. The output of HASH unit 310 is the initialization vector used by AES in counter mode. Using counter mode, any length of plaintext may be processed, as opposed to only plaintext lengths of a multiple of the cipher's block length for other modes, e.g. Cipher Block Chaining (CBC). Other examples of suitable encryption algorithms are AES in Electronic Codebook (ECB), Cipher Block Chaining (CBC), Output Feedback (OFB), Cipher Feedback (CFB), or XEX-based tweaked-codebook mode with ciphertext stealing (XTS) can be used. See [MODES] for an explanation of the first 4 example modes and [XTS-AES] for XTS-AES.

The input for the HASH unit 310 comprises at least AD and V, a hash of P provided by a further HASH unit HASH 311. Optionally, the HASH unit also receives the integrity key k1 as part of the input to be hashed. Also, if a keyed hash function is chosen, the keyed HASH unit receives k1 as key.

Unit V 321 stores the output of HASH unit 311. So, HASH unit 311 is a block that performs a hash function. This may be e.g. a hash function from the SHA2 family (SHA-224, SHA-256, SHA-384, or SHA-512, see [RFC 6234]), or S2V from [RFC 5297] using P as a single component of input data, or any other, preferably cryptographic, hash function. An embodiment used to create Table 3 and Table 4 below uses SHA-256 in the HASH unit 311 and S2V in the HASH unit 310. The HASH unit 311 may also be a keyed HASH unit as elucidated below with FIGS. 6, 7, 8 and 9.

Figure 10:
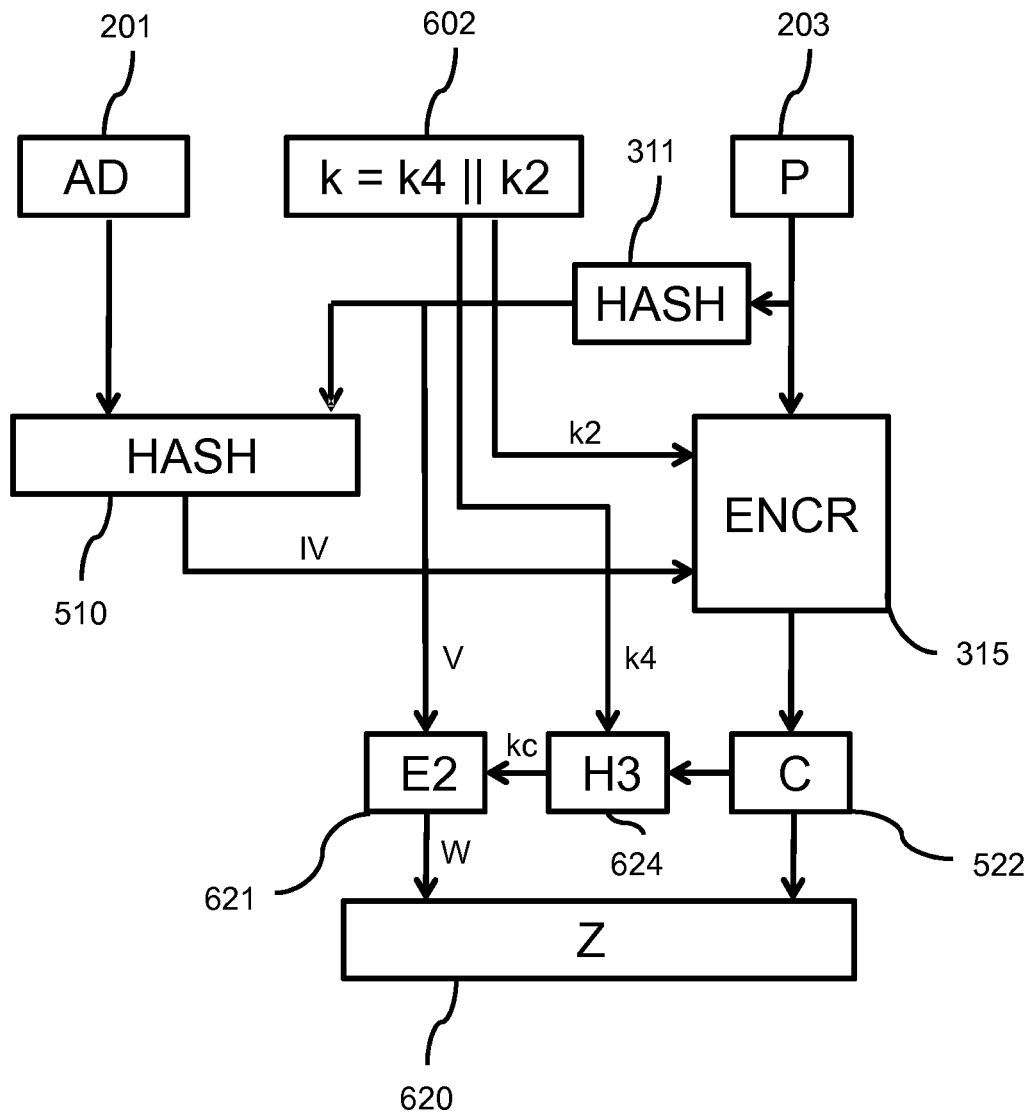
FIG. 10 shows a fourth example of enhanced encryption.

The encrypted data C 322 and a message integrity value W identical to integrity value V are included in message Z 320, for example a concatenation of C and V. The message integrity value W may also be a protected version of the integrity value V, e.g. an encrypted version using a further integrity key. FIG. 10 shows a further example of determining W.

The following properties of the enhanced system can be determined by analyzing the block diagram shown in FIG. 4. Examples supporting are provided in Table 3.

The first property is the same as property P1 of AES-SIV. Because of the properties of hash functions, a change of at least one bit in the plaintext P will lead to many changed bits in the initialization vector for the block ENCR, so will also lead to many changed bits in C, the encrypted plaintext, see also case 2 in Table 3.

The second property is the same as property P2 of AES-SIV. A change of at least one bit in the associated data AD will lead to many changed bits in the initialization vector for the block ENCR, so will also lead to many changed bits in C, the encrypted plaintext, see also case 3 in table 3.

The third property is the same as property P3 of AES-SIV. From FIG. 4, it is also apparent that the plaintext P has to be processed in its entirety before encryption can begin, because all bits of the plaintext are used in the computation of the block HASH.

TABLE 3

Example results for enhanced encryption

| Case | Plaintext input P | AD 1 | Authentication value V | Encrypted output C |
|---|---|---|---|---|
| Case 1 Using test vectors of A.1 of [RFC 5297] | 11223344 55667788 99aabbcc ddee | 10111213 14151617 18191a1b 1c1d1e1f 20212223 24252627 | 5a68d9ad f4fd31c0 4a6c8177 4c76e910 | 265f7491 a2c60ad8 4440e0c1 6cd7 |
| Case 2 1-bit change in P | 11223344 55677788 99aabbcc ddee (1 changed bit) | 10111213 14151617 18191a1b 1c1d1e1f 20212223 2425262 | 40bcc840 e023e0be 0c366b9d c58391fc (126 changed bits) | a3cc3ae3 7a2350c5 58a9db04 8d8a |
| Case 3 1-bit change in AD 1 | 11223344 55667788 99aabbcc ddee | 10011213 14151617 18191a1b 1c1d1e1f 20212223 24252627 (1 changed bit) | 5a68d9ad f4fd31c0 4a6c8177 4c76e910 (56 changed bits) | 3f04dd60 11a2db82 e64610d8 5b3a |

The key used for encryption is from A.1 of [RFC 5297] (fffefdfc fbfaf9f8 f7f6f5f4 f3f2f1f0 f0f1f2f3 f4f5f6f7 f8f9fafb fcfdfeff)

Figure 5:
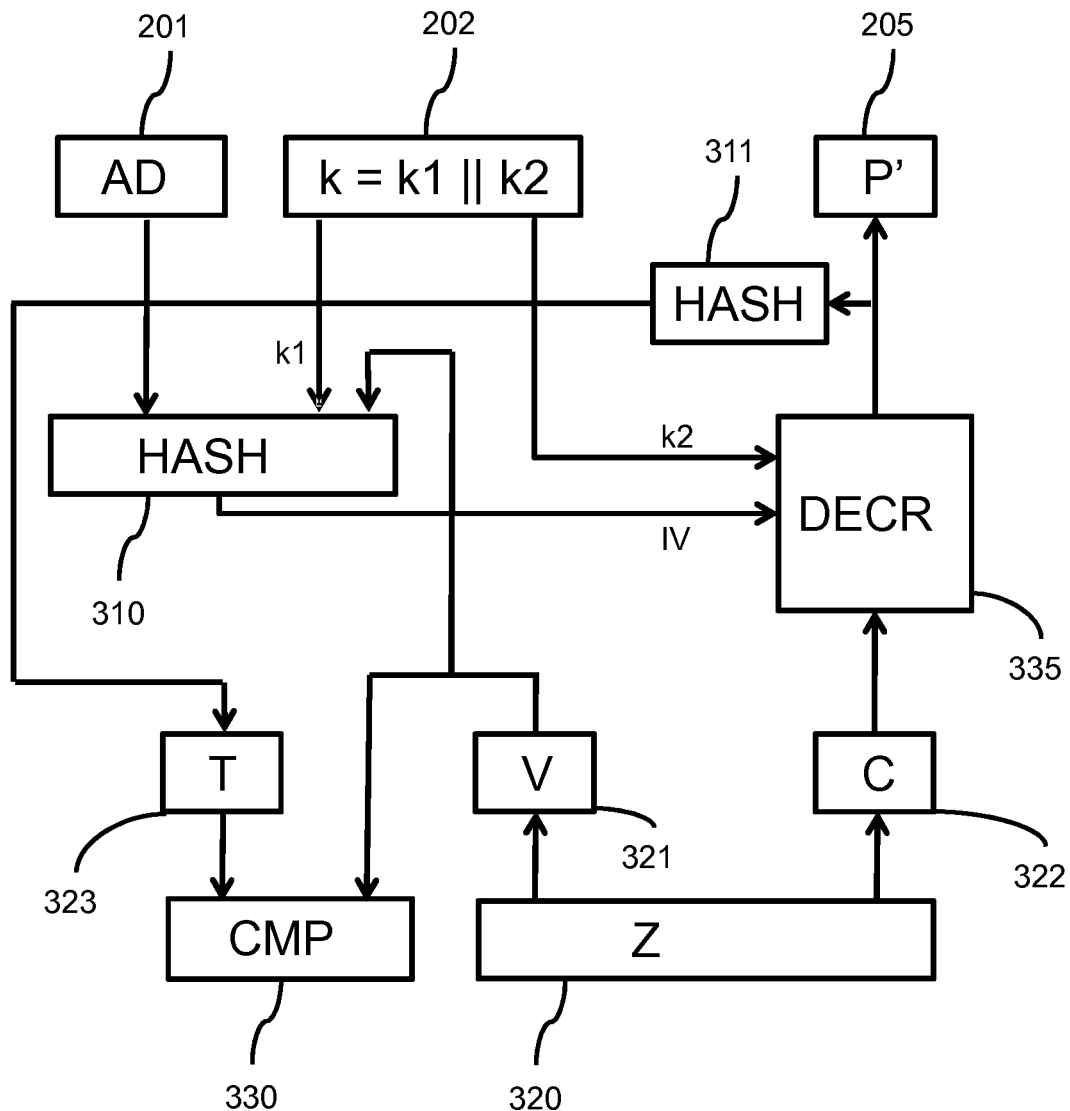
FIG. 5 shows a block diagram of enhanced decryption.

FIG. 5 shows a block diagram of enhanced decryption. In the Figure, unit Z 320 is arranged to receive an input message for decryption as generated by the encryption process as discussed with reference to FIG. 4. The message comprises the encrypted data C and a message integrity value W based on the integrity value V as discussed above. Unit V 321 retrieves the integrity value V, if necessary by first decrypting value W. A further example of determining V from a message is discussed with reference to FIG. 11. Unit C 322 retrieves the encrypted data C, which is the plaintext P encrypted according to FIG. 4. The integrity value V is used to check the validity (integrity and authenticity) of the received data in comparator CMP 330. Unit K 202 has the secret key (k) to be used, which may of two parts, k1 and k2. k1 is the integrity key that may be used for the authenticity/integrity check, while k2 is the key to be used for encryption/decryption. The unit AD 201 has the associated data, which may be transferred with the message Z 320, or separately.

The unit DECR 335 is a block that performs decryption of encrypted data from unit C 322 using a decryption compatible to the encryption as chosen above in FIG. 4, for example AES in counter mode, see [MODES]. Encryption key k2 is also the decryption key and the initialization vector IV is provided by the output of HASH unit 310.

Unit P' 205 receives the plaintext output of the decryption from the block DECR. The plaintext output may only be used if the validity check is positive.

HASH unit 310 is a block that performs the hash function equal to the HASH unit 310 in the encryption shown in FIG. 4. The input for the HASH unit 310 comprises at least AD and V (derived from message integrity value W as received). Optionally, the HASH unit 310 also receives the integrity key k1 as part of the input to be hashed. Also, if a keyed hash function is used, the keyed HASH unit receives k1 as key.

HASH unit 311 is a block that performs the hash function equal to the HASH unit 311 in the encryption shown in FIG. 4 using P' as a single component as input. An embodiment used to create Table 3 and Table 4 below uses SHA-256 in the HASH unit 311 and S2V in the HASH unit 310.

A test value T 323 is output of the HASH unit 311 and is provided to the comparator CMP 330, where T is compared to the received V. If they are equal, the validity check is positive and the decrypted plaintext P' is identical to the plaintext P that was used during encryption. If T and V are not equal, the integrity test fails and the decrypted plaintext P' must be discarded.

The following properties of the above implantation of the enhanced cipher can be determined by analyzing the block diagram of decryption in FIG. 5, while examples supporting this can be found in Table 4.

The fourth property is the same as property P4 of AES-SIV. Using the correct associated data, an unchanged integrity value V and unchanged encrypted data C as input for the decryption will lead to decrypted plaintext P' that is identical to the plaintext P that was used during encryption. Furthermore, T equals V in this case so the enhanced cipher does not detect an authenticity/integrity fault. See also case 4 in Table 4.

The fifth property is enhanced and different from property P5 of AES-SIV. A change of at least one bit in the associated data used for the decryption of C will lead to many bits in the decrypted plaintext P' that are different from the plaintext P that was used during encryption. Like AES-SIV, the enhanced cipher detects an authenticity/integrity fault in this case. See also case 5 in Table 4. However, contrary to AES-SIV, P' is not usable if the additional data AD has been manipulated.

The sixth property is the same as property P6 of AES-SIV. A change in at least one of the bits of the integrity value V used for the decryption of C leads to many bits in the decrypted plaintext P' that are different from the plaintext P that was used during encryption. This is because V is also input to HASH unit 310, which produces the initialization vector. Also, an authenticity/integrity fault is detected in this case. See also case 6 in Table 4.

The seventh property is the same as property P7 of AES-SIV. A change in at least one of the bits of the encrypted input C for decryption leads to changes in the corresponding bits in the decrypted plaintext P'. The enhanced cipher detects an integrity fault in this case. See also case 7 in Table 4.

the input cannot be reconstructed from the output. For example, the HASH unit may provide a digital signature, such as a keyed-hash message authentication code (HMAC), e.g. HMAC_SHA1 [RFC 2104], or HMAC_SHA256/384/512 [RFC 4868], using a (symmetric) key k4, which

TABLE 4

Example results for enhanced decryption

| Case | AD 1 used for decryption | Authentication value V used for decryption | Encrypted input C used for decryption | Decrypted output P' | T = V |
|---|---|---|---|---|---|
| Case 4 No change in AD, V and C | 10111213 14151617 18191a1b 1c1d1e1f 20212223 24252627 | 5a68d9ad f4fd31c0 4a6c8177 4c76e910 | 265f7491 a2c60ad8 4440e0c1 6cd7 | 11223344 55667788 99aabbcc ddee (Identical to P) | Yes |
| Case 5 1-bit change in AD 1 | 10011213 14151617 18191a1b 1c1d1e1f 20212223 24252627 (1 changed bit) | 5a68d9ad f4fd31c0 4a6c8177 4c76e910 | 265f7491 a2c60ad8 4440e0c1 6cd7 | 08799ab5 e602a6d2 3bac4bd5 ea03 (56 changed bits) | No |
| Case 6 1-bit change in V | 10111213 14151617 18191a1b 1c1d1e1f 20212223 24252627 | 5a68d9ad f4dd31c0 4a6c8177 4c76e910 (1 changed bit) | 265f7491 a2c60ad8 4440e0c1 6cd7 | 12d181f7 834ae372 850c6066 263f (62 changed bits) | No |
| Case 7 1-bit change in C | 10111213 14151617 18191a1b 1c1d1e1f 20212223 24252627 | 5a68d9ad f4fd31c0 4a6c8177 4c76e910 | 265f7491 a2c60adQ 4440e0c1 6cd7 (1 changed bit) | 11223344 55667780 99aabbcc ddee (1 changed bit) | No |

The key used for encryption and decryption is from A.1 of [RFC 5297]. The plaintext P and AD 1 from A.1 of [RFC 5297] are used during encryption to produce the (unchanged) initialization vector V and encrypted input C.

In the above described examples, AES in counter mode is used for encryption and decryption. However, the invention is not limited to this cipher or mode. Any cipher in counter can be used, e.g. DES or 3DES in counter mode can be used. 3DES is specified in [3DES]. DES was originally approved as FIPS 46 by NIST in January 1977. Also, any cipher in any mode may be used. E.g. AES in Electronic Codebook (ECB), Cipher Block Chaining (CBC), Output Feedback (OFB), Cipher Feedback (CFB), or XEX-based tweaked-codebook mode with ciphertext stealing (XTS) can be used. See [MODES] for an explanation of the first 4 example modes and [XTS-AES] for XTS-AES. The selection of a mode depends on the requirements of the application, e.g. whether the encryption or decryption is parallelizable or not. However, in [EVAL], it is argued that from the 6 modes mentioned here, "Overall, [CTR is] usually the best and most modern way to achieve privacy-only encryption." FIGS. 4 and 5 show a generalized encryption scheme according to the invention. In FIG. 4, the block "Encryption" can be any cipher in any mode, encrypting the input P using key k2 and the output of the block HASH 310 as initial vector. The function of HASH 310 may also be S2V as described above with FIGS. 2 and 3. Likewise, FIG. 5 shows a generalized decryption scheme according to the invention, where "Decryption" can be any cipher in any mode, decrypting the input C using key k2 and the output of the block HASH 310 as initial vector.

The HASH unit 310 and/or the HASH unit 311 may be further embodied as follows, while keeping the property that key may be independent from k1 and/or k2, may be derived somehow or be equal to k1 and/or k2, a digital signature using public key cryptography, such as e.g. Digital Signature Algorithm (DSA) [FIPS 186-4], Rivest-Shamir-Adleman (RSA) based digital signature algorithm [FIPS 186-4] and Elliptic Curve Digital Signature Algorithm (ECDSA) [FIPS 186-4], using public key k5 and private key k6, where the encryption uses the private key k6 and the decryption uses the public key k5.

Figure 6:
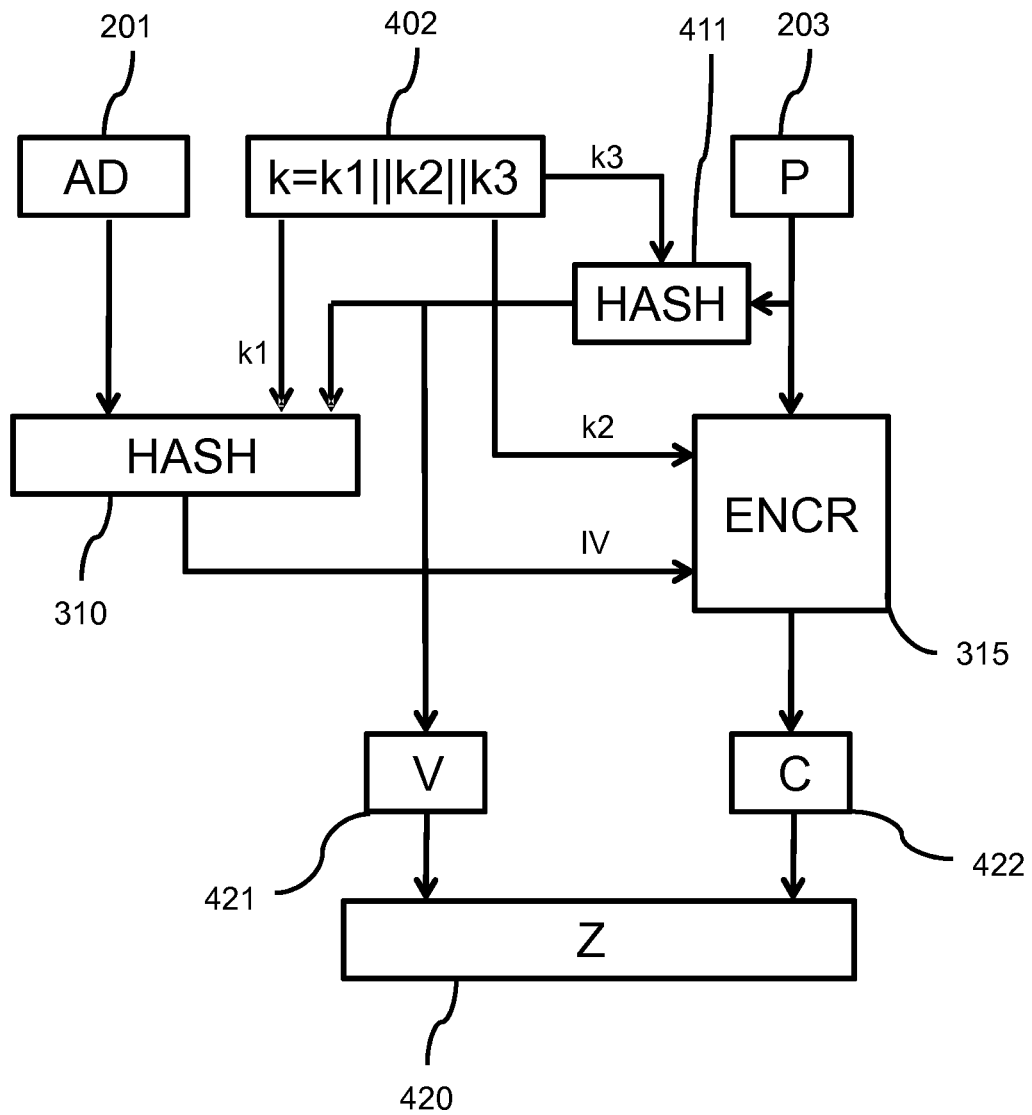
FIG. 6 shows a second example of enhanced encryption.

FIG. 6 shows a second example of enhanced encryption. The block diagram has similar elements of the above enhanced encryption as described with reference to FIG. 4, while the following is different. In the Figure, unit K 402 is the key to be used. It consists of three parts, k1 and k2 and k3; k1 is the integrity key to be used for the integrity check and k2 is the key to be used for encryption/decryption, while k3 is a further integrity key used for a keyed HASH in keyed HASH unit 411. The encryption unit ENCR 315 generates the encrypted data C 422 based on the encryption key k2 and the initialization vector IV from the HASH unit 310.

The input for the HASH unit 310 comprises k1, AD and V, a hash of P provided by the keyed HASH unit 411. Unit V 421 stores the output of keyed HASH unit 411. The encrypted data C 422 and message integrity value W based on integrity value V 421 are included in message Z 420, for example a concatenation of C and V. Optionally, V may be encrypted to produce the message integrity value W.

Figure 7:
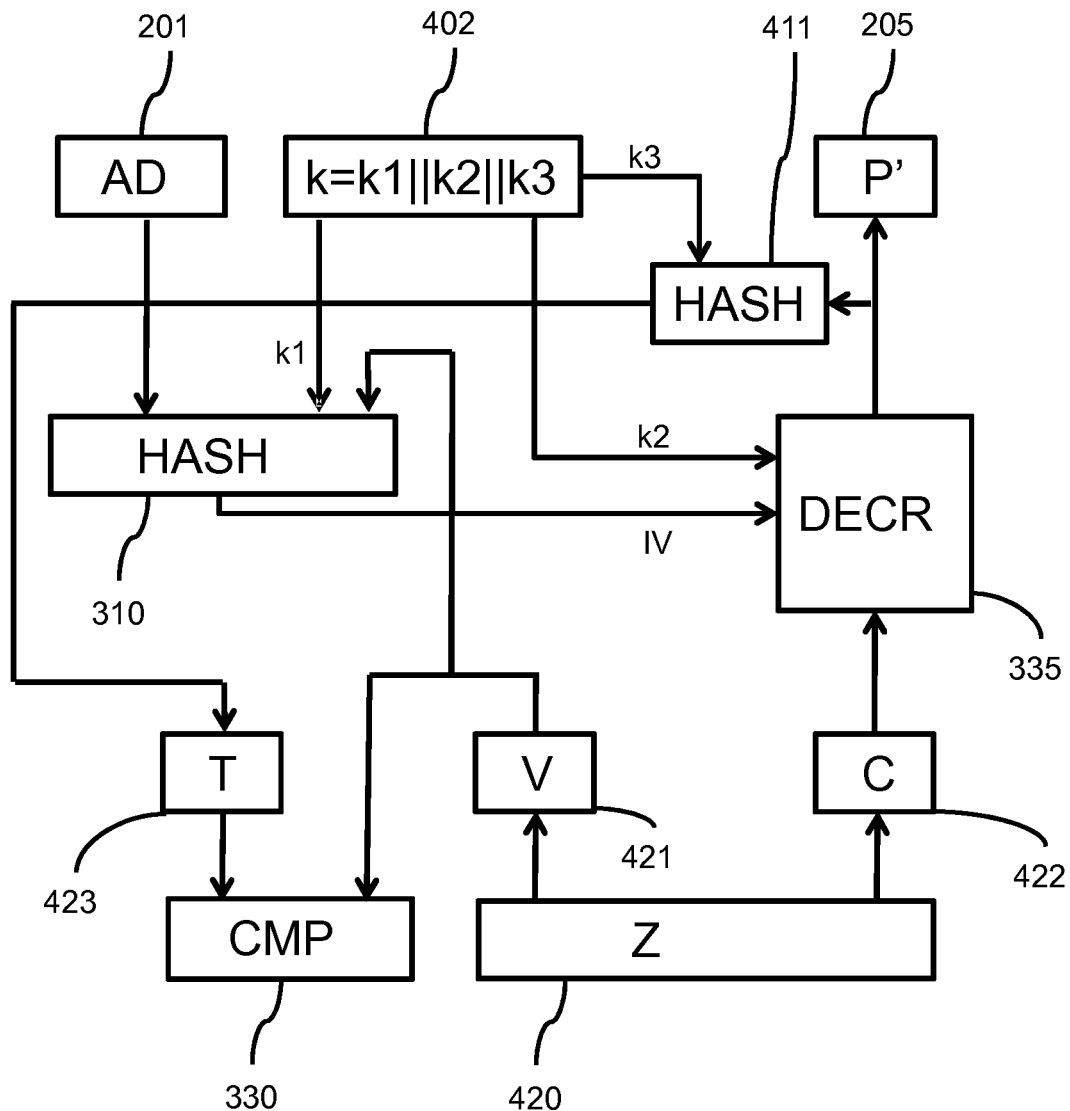
FIG. 7 shows a second example of enhanced decryption.

FIG. 7 shows a second example of enhanced decryption. The block diagram has similar elements of the above enhanced decryption as described with reference to FIG. 5, while the following is different. In the Figure, unit Z 420 receives the input message for decryption as generated by the encryption process as discussed with reference to FIG. 6. Unit V 421 retrieves the integrity value V from message integrity value W, while unit C 422 retrieves the encrypted data C, which is the plaintext P encrypted according to FIG. 6. The integrity value V is used to check the validity (integrity and authenticity) of the received data in comparator CMP 330. Unit K 402 has the key to be used, consisting of three parts, k1 and k2 and k3. k1 is the integrity key to be used for the authenticity/integrity check, while k2 is the key to be used for decryption and k3 is a further integrity key used for a keyed hash function in HASH unit 411.

The unit DECR 335 is a block that performs decryption of encrypted data from unit C 422 using a decryption compatible to the encryption as chosen above in FIG. 6. Encryption key k2 is also the decryption key, and the initialization vector IV is provided by the output of HASH unit 310. The input for the HASH unit 310 comprises k1, and AD and V (as derived, or decrypted from W). Unit P' 205 receives the plaintext output of the decryption from the block DECR. The plaintext output may only be used if the validity check is positive.

HASH unit 411 is a block that performs the keyed hash function equal to the HASH unit 411 in the encryption shown in FIG. 6 while using P' as input. A test value T 423 is output of the keyed HASH unit 411 and is provided to the comparator CMP 330, where T is compared to the received V. If they are equal, the validity check is positive and the decrypted plaintext P' is identical to the plaintext P that was used during encryption. If T and V are not equal, the integrity test fails and the decrypted plaintext P' must be discarded.

Figure 8:
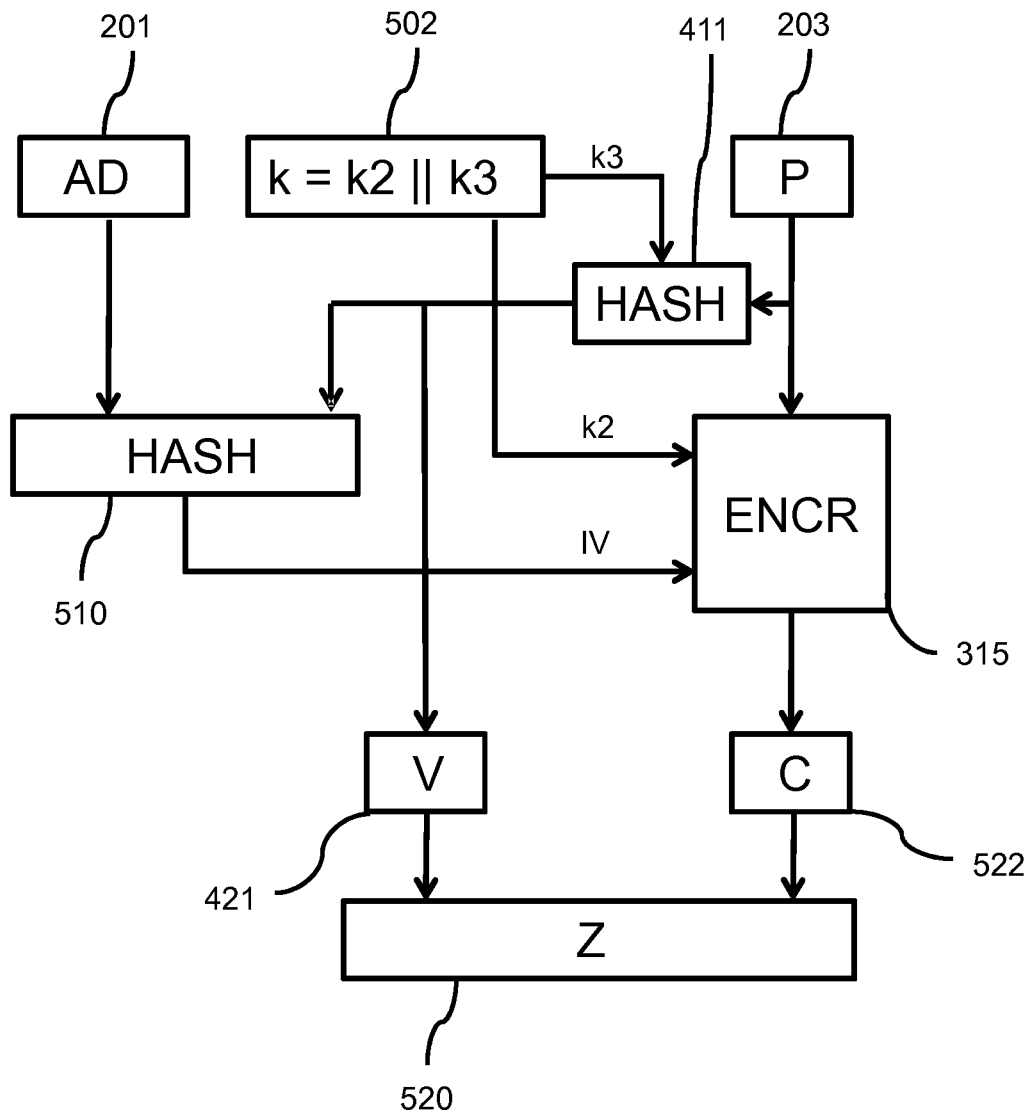
FIG. 8 shows a third example of enhanced encryption.

FIG. 8 shows a third example of enhanced encryption. The block diagram has similar elements of the above enhanced encryption as described with reference to FIGS. 4 and 6, while the following is different. In the Figure, unit K 502 is the key to be used. It consists of two parts, k2 and k3; k2 is the key to be used for encryption/decryption, while k3 is an integrity key used for a keyed HASH in keyed HASH unit 411 operating on P. The encryption unit ENCR 315 generates the encrypted data C 522 based on the encryption key k2 and the initialization vector IV from the HASH unit 510.

The input for the HASH unit 510 comprises AD and V, a hash of P provided by the keyed HASH unit 411. Unit V 421 stores the output of keyed HASH unit 411. The encrypted data C 522 and integrity value V 421 are included in message Z 520. Optionally, V may be encrypted to produce the message integrity value W.

Figure 9:
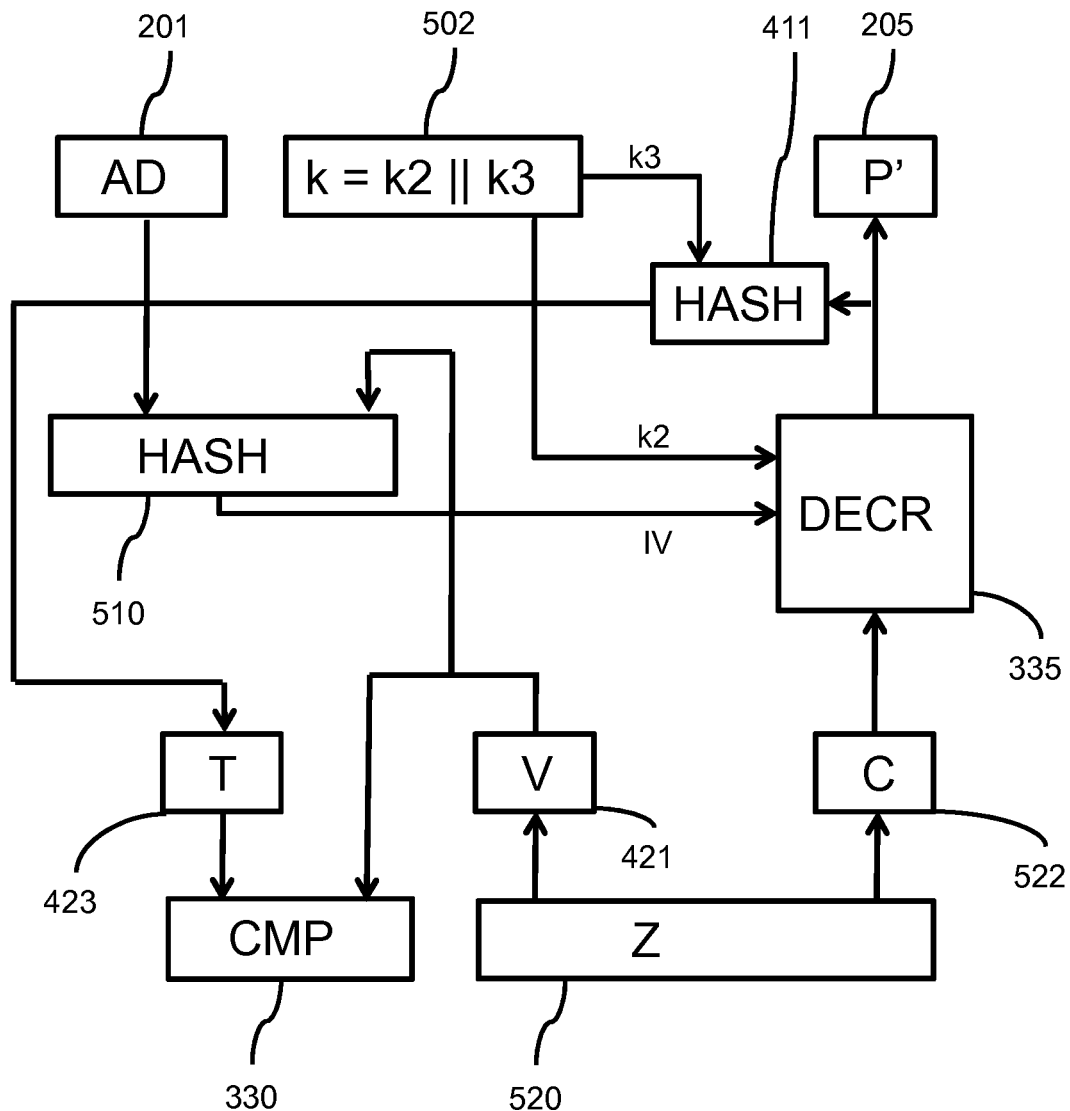
FIG. 9 shows a third example of enhanced decryption.

FIG. 9 shows a third example of enhanced decryption. The block diagram has similar elements of the above enhanced decryption as described with reference to FIGS. 5 and 7, while the following is different. In the Figure, unit Z 520 receives the input message for decryption as generated by the encryption process as discussed with reference to FIG. 8. Unit V 421 retrieves the integrity value V using message integrity value W, as described above, while unit C 522 retrieves the encrypted data C, which is the plaintext P encrypted according to FIG. 8. The integrity value V is used to check the validity (integrity and authenticity) of the received data in comparator CMP 330. Unit K 502 has the key to be used, consisting of two parts, k2 and k3. k2 is the key to be used for decryption and k3 is used for a keyed HASH in keyed HASH unit 411.

The unit DECR 335 is a block that performs decryption of encrypted data from unit C 522 using a decryption compatible to the encryption as chosen above in FIG. 8. Encryption key k2 is also the decryption key and the initialization vector IV is provided by the output of HASH unit 510. The input for the HASH unit 510 is AD and V (as received, or decrypted from W). Unit P' 205 receives the plaintext output of the decryption from the block DECR. The plaintext output may only be used if the validity check is positive.

HASH unit 411 is a block that performs the keyed hash function equal to the keyed HASH unit 411 in the encryption shown in FIG. 8 using k3 and P' as input. A test value T 423 is output of the keyed HASH unit 411 and is provided to the comparator CMP 330, where T is compared to the received V. If they are equal, the integrity check is positive and the decrypted plaintext P' is identical to the plaintext P that was used during encryption. If T and V are not equal, the integrity test fails and the decrypted plaintext P' must be discarded.

It appears that the third example of the enhanced cipher is both practical and strong. The key k consists of only two parts, while it is difficult to obtain the plaintext P from the integrity value V because of the keyed hash in unit HASH 411. On the other hand, it is also possible to use two predefined hash functions, i.e. hashing without a secret key, for both HASH units, which requires only a single secret encryption key k2 for both encryption and decryption.

FIG. 10 shows a fourth example of enhanced encryption. The block diagram has similar elements of the above enhanced encryption as described with reference to FIG. 4, while the following is different. In the Figure, unit K 602 is the key to be used, at least comprising the encryption key k2. It may also consist of two parts, k4 and k2; k4 is an integrity key that may be used for a further HASH unit H3 624 and k2 is the key to be used for encryption/decryption. The unit HASH 510 is a hash function, e.g. as described with reference to FIG. 8. The output of HASH unit 510 is used as the Initialization Vector (IV) for encryption unit ENCR 315, which generates the encrypted data C 522 based on the encryption key k2. Examples of a suitable encryption have been discussed above.

The input for the HASH unit 510 are at least AD and V, a hash of P provided by a further HASH unit HASH 311, as discussed above. Optionally, the HASH unit also receives an integrity key k1 as part of the input to be hashed, similar to HASH unit 310 discussed with reference to FIG. 4. Also, if a keyed hash function is chosen, the keyed HASH unit receives k1 as key.

The unit HASH 311 is a hash function, e.g. as described with reference to FIG. 4. Optionally, the HASH unit also receives an integrity key k3 as part of the input to be hashed, like in FIG. 6 or 8. Also, if a keyed hash function is chosen, the keyed HASH unit receives k3 as key. The unit HASH 311 has P 203 as input.

Encryption unit E2 621 receives the integrity value V from HASH unit 311, and receives a derived key kc from the further HASH unit H3 624. The encryption unit 621 encrypts V to generate the message integrity value W. The further HASH unit 624 uses the encrypted data C as input. The further HASH unit H3 624 may be similar to the first and second HASH unit, and may be a keyed HASH unit, which receives a further secret integrity key k4 from key unit 602.

The encrypted data C 522 and a message integrity value W based on integrity value V are included in message Z 620, for example a concatenation of C and W. The message integrity value now is a protected version of the integrity value V, i.e. an encrypted version using the derived key kc. Effectively, the integrity value is protected against manipulation, while also the encrypted data C cannot be manipulated without disturbing the decryption of C. Hence, a single bit change in C will result in many changed bits in the decrypted plaintext, as elucidated below.

Figure 11:
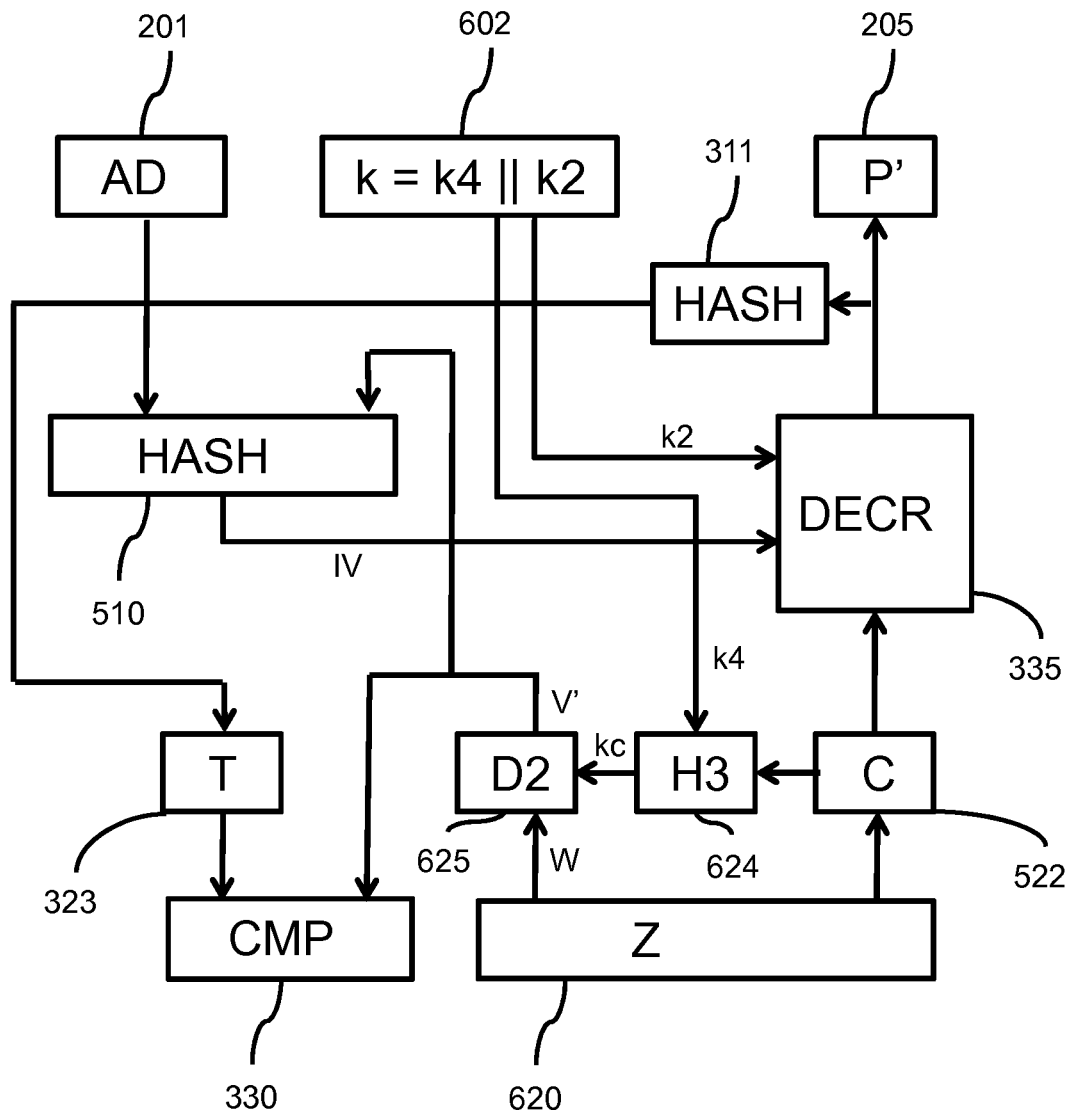
FIG. 11 shows a fourth example of enhanced decryption.

FIG. 11 shows a fourth example of enhanced decryption. The block diagram has similar elements of the above enhanced decryption as described with reference to FIG. 5, while the following is different. In the Figure, unit Z 620 receives the input message for decryption as generated by the encryption process as discussed with reference to FIG. 10.

Unit D2 625 retrieves the integrity value V by decrypting message integrity value W using a derived key kc from the further HASH unit H3 624. Further HASH unit H3 624 is a block that performs the hash function equal to the further HASH unit H3 624 in the encryption shown in FIG. 10. The input of the further HASH unit 624 is the encrypted data C as received. Hence a single bit change in C will result in a very different derived key kc, and therefore to a very different integrity value V and a very different initialization vector IV, which will therefore also result in a very different decrypted plaintext P'. The further HASH unit H3 624 may be a keyed HASH unit, which receives a further secret integrity key k4 from key unit 602. Unit C 522 retrieves the encrypted data C, which is the plaintext P encrypted according to FIG. 10.

The integrity value V is used to check the validity (integrity and authenticity) of the received data in comparator CMP 330. Unit K 602 has the secret key (k) to be used, which may of two parts, k4 and k2. Key k4 is the further secret integrity key that may be used for a keyed HASH unit 624, while k2 is the key to be used for encryption/decryption.

The HASH unit 510 at least received the additional data AD and the integrity value V as input. Optionally, the HASH unit 510 also receives the integrity key k1 as part of the input to be hashed. Also, if a keyed hash function is used, the keyed HASH unit 510 receives k1 as key. Hash unit 510 is a block that performs the hash function equal to the HASH unit 510 in the encryption shown in FIG. 10.

A test value T is output of the HASH unit 311 and is provided to the comparator CMP 330, where T is compared to the integrity value V as decrypted from message integrity value W. If they are equal, the validity check is positive and the decrypted plaintext P' is identical to the plaintext P that was used during encryption. If T and V are not equal, the integrity test fails and the decrypted plaintext P' must be discarded.

It appears that also the fourth example of the enhanced cipher is both practical and strong. The key k consists of only two parts, while it is difficult to obtain the plaintext P and the integrity value V because of the keyed hash in unit 624. On the other hand, it is also possible to use three predefined hash functions, i.e. hashing without a secret key, for all HASH units, which requires only a single secret encryption key k2 for both encryption and decryption. While the value V may then be retrieved by anyone knowing the encrypted data C, manipulation of C is still impossible without disturbing the decryption and integrity test at the final receiver.

Figure 12:
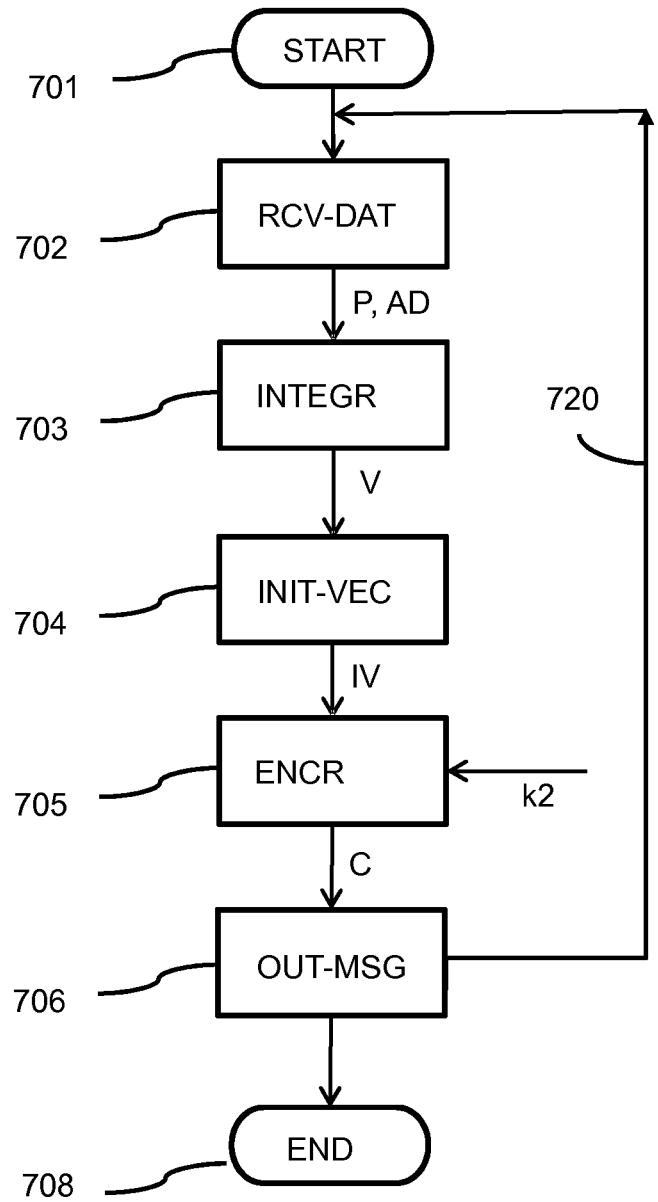
FIG. 12 shows an encryption method for encrypting input data and protecting integrity of the input data and associated data.

FIG. 12 shows an encryption method for encrypting input data and protecting integrity of the input data and associated data. In the method, an encryption process starts at node START 701. In a first stage RCV-DAT 702 plaintext P and associated data AD is received. Next, in stage INTEGR 703, an integrity value V is computed based on the plaintext P using a first hash function. Next, in stage INIT-VEC 704 an initialization vector is computed by using a second hash function based on the integrity value and the associated data, the initialization vector being different from the integrity value. One or two integrity keys may be used for the hash functions for computing the integrity value and/or the initialization vector. Next, in a stage ENCR 705, the input data P is encrypted to generate encrypted data C using the initialization vector IV and a second encryption key k2. Next, in stage OUT-MSG 706, an output encrypted message is generated comprising the encrypted data C and the integrity value V. Next, the process is terminated at stage END 708, unless further input data is received. If so, the method continues at stage RCV-DAT as indicated by arrow 720.

In an embodiment, the method includes, in the first stage RCV-DAT determining the amount of input data. Upon determining that the amount is below a predetermined threshold, padding data is added to the input data to increase the total amount of plaintext to be encrypted in one message, e.g. by concatenating the padding data at the begin or the end of the original plaintext. The padding data may, for example, be random data, or all zero data. For example, padding may be required if only plaintext lengths of a multiple of the cipher's block length are allowed. Optionally, the predetermined threshold is the length of the encryption key. The length of the padding data, or the amount of plaintext, may be included in the message, e.g. as part of the additional data.

Furthermore, it is noted that the encryption method may include, in stage OUT-MSG 706, adding further data to the message. However, the output encrypted message will not contain the initialization vector, as this would compromise the data protection. For example, in that case malicious devices might use the initialization vector as included in the message instead of calculating the initialization vector via said second hash function as required in stage INIT-VEC 752 in the decryption method elucidated now.

Figure 13:
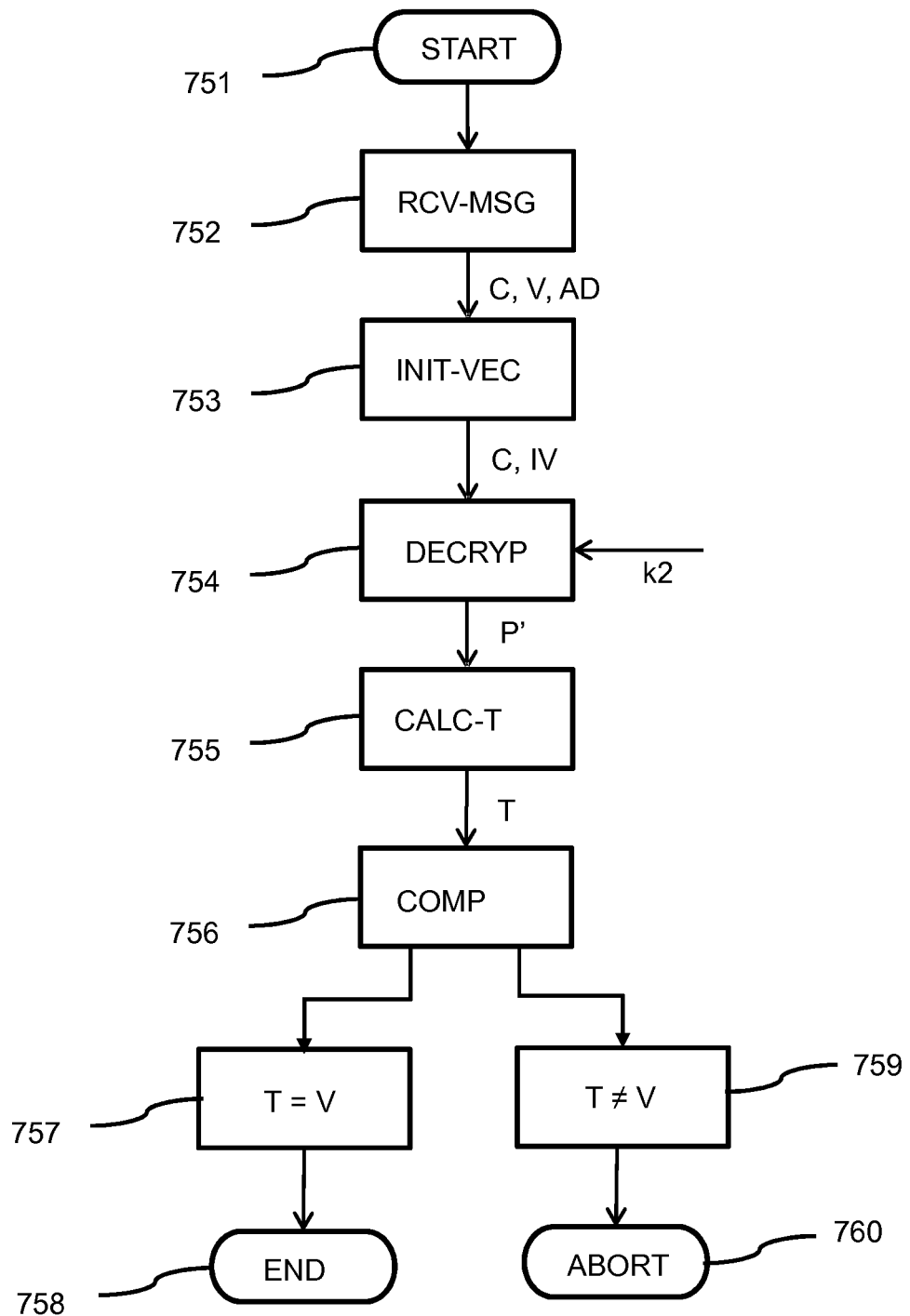
FIG. 13 shows a decryption method for decrypting encrypted data and determining integrity of the data and associated data.

FIG. 13 shows a decryption method for decrypting encrypted data and determining integrity of the data and associated data. In the method, a decryption process starts at node START 751. In a first stage RCV-MSG 752 a message is received. The obtained, encrypted message contains the encrypted data C and an integrity value V, which are both retrieved from the message. Also, associated data AD is received, either with the message or separately. Next, in stage INIT-VEC 753 an initialization vector IV is computed based on the integrity value and the associated data, the initialization vector being different from the integrity value. The computation involves a hash function. Next, in stage DECRYP 754, the encrypted data C is decrypted to generate plaintext P' using the initialization vector IV and a decryption key k2. Next, in stage CALC-T 755 a test value T is calculated based on the plaintext P' using a further hash function, equal to the corresponding hash function used during encryption. One or two integrity keys may be used for the hash functions for computing the integrity value and/or the initialization vector. Next, in a stage COMP 756, the test value T and the received value V are compared for determining the integrity by comparing the test integrity value and the received integrity value. Next, upon determining that T equals V in stage 757, the process is successfully terminated at stage END 758. However, upon determining that T does not equal V in stage 759, the process is unsuccessfully terminated at stage ABORT 760.

The methods may be executed, for example, by circuitry and software in a processor in a stationary or mobile computing device. Suitable hash functions, encryption and decryption functions have been described above. It is noted that FIG. 13 shows a method for a device having the decryption role, which may be cooperating with a device embedding the encryption method of FIG. 12.

Many different ways of implementing the method are possible, as will be apparent to a person skilled in the art. For example, the order of the stages or steps can be varied or some stages may be executed in parallel. Moreover, in between steps other method steps may be inserted. The inserted steps may represent refinements of the method such as described herein or may be unrelated to the method.

Computer program products, downloadable from a network and/or stored on a computer-readable medium and/or microprocessor-executable medium, are provided that comprise program code instructions for implementing the above method, connection sequence, security process and further operations when executed on a computer device. So, the method according to the invention may be executed using software, which comprises instructions for causing a processor system to perform the respective method.

Typically, devices that execute the above encryption process, each comprise a processor coupled to a memory containing appropriate software code stored at the devices; for example, that software may have been downloaded and/or stored in a corresponding memory, e.g., a volatile memory such as RAM or a non-volatile memory such as Flash (not shown). The devices may for example be equipped with microprocessors and memories (not shown). Alternatively, the devices may, in whole or in part, be implemented in programmable logic, e.g., as field-programmable gate array (FPGA). The devices and server may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method. It will be appreciated that the software may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 14A:
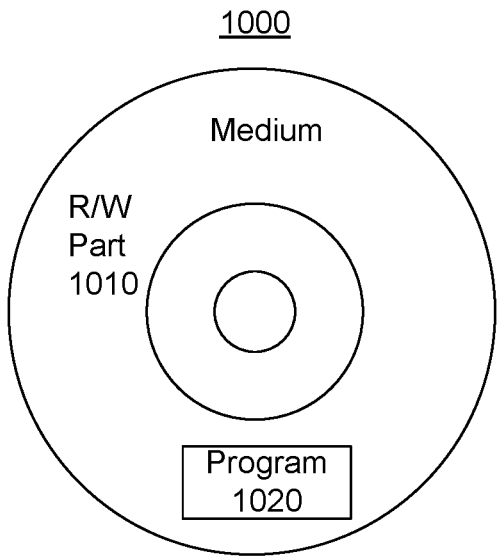
FIG. 14a shows a computer readable medium.

FIG. 14a shows a computer readable medium 1000 having a writable part 1010 comprising a computer program 1020, the computer program 1020 comprising instructions for causing a processor system to perform one or more of the above methods and processes as described with reference to FIGS. 1, 4-11. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 14B:
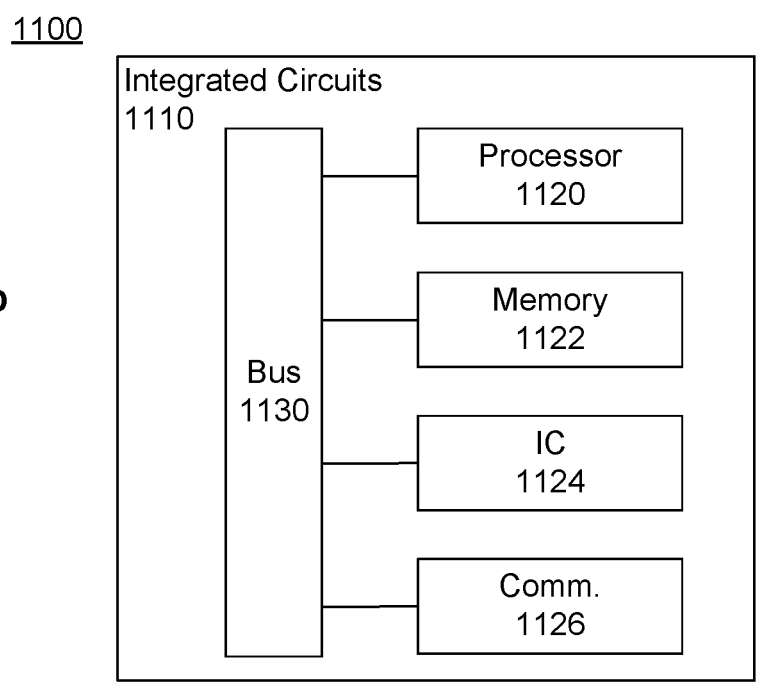
FIG. 14b shows in a schematic representation of a processor system.

FIG. 14b shows in a schematic representation of a processor system 1100 according to an embodiment of the device or methods as described with reference to FIGS. 1, 4-11. The processor system may comprise a circuit 1110, for example one or more integrated circuits. The architecture of the circuit 1110 is schematically shown in the Figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, a transceiver, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for wired and/or wireless communication, using connectors and/or antennas, respectively.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the word 'comprising' does not exclude the presence of elements or steps other than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

In summary, a device is arranged for encrypting input data and protecting integrity of the input data and associated data. An encryption processor has a first HASH unit arranged to compute an integrity value based on the input data, a second HASH unit arranged to compute an initialization vector based on the integrity value and the associated data. At least one of the HASH units may be a keyed HASH unit. An encryption unit is arranged for encrypting the input data to generate encrypted data using the initialization vector and an encryption key. Effectively, the initialization vector is different from the integrity value. As the initialization vector depends on both the integrity value and the associated data, any change therein will result in failure of the decryption and decrypted data that are very different from the original plaintext P.

REFERENCE DOCUMENTS

[3DES] SP 800-67 Rev. 2, Recommendation for the Triple Data Encryption Algorithm (TDEA) Block Cipher
[CMAC] Dworkin, M., "Recommendation for Block Cipher Modes of Operation: The CMAC Mode for Authentication", NIST Special Publication 800-38B, May 2005.
[DH] Diffie, W.; Hellman, M. (1976), "New directions in cryptography", IEEE Transactions on Information Theory, 22 (6): 644-654
[DSS] "Digital Signature Standard (DSS)", USA, National Institute of Standards and Technology, Federal Information Processing Standard (FIPS) 186-4.
[EVAL] Phillip Rogaway, "Evaluation of Some Blockcipher Modes of Operation", University of California, Davis, Feb. 10, 2011.
[MODES] Dworkin, M., "Recommendation for Block Cipher Modes of Operation: Methods and Techniques", NIST Special Publication 800-38A, 2001 edition.
[RFC2104] "HMAC: Keyed-Hashing for Message Authentication", February 1997.
[RFC4868] "Using HMAC-SHA-256, HMAC-SHA-384, and HMAC-SHA-512 with IPsec", May 2007
[RFC5297] Synthetic Initialization Vector (SIV) Authenticated Encryption Using the Advanced Encryption Standard (AES), October 2008, (https://datatracker.ietf.org/doc/rfc5297/)
[RFC6234] US Secure Hash Algorithms (SHA and SHA-based HMAC and HKD, May 2011, (https://datatracker.ietf.org/doc/rfc6234/)
[XTS-AES] Dworkin, M., "Recommendation for block cipher modes of operation: The XTS-AES mode of confidentiality on storage devices", NIST Special Publication 800-38E, January 2010.

The invention claimed is:
1. An encryption method, comprising:
computing an integrity value based on an input data using a first hash function;
computing an initialization vector based on the integrity value and an associated data using a second hash function,
wherein the initialization vector is different from the integrity value;
encrypting the input data to generate encrypted data using the initialization vector and an encryption key; and
generating an output encrypted message,
wherein the output encrypted message comprises the encrypted data and a message integrity value,
wherein the output encrypted message does not comprise the initialization vector,
wherein the message integrity value is based on the integrity value,
wherein the associated data is associated with the output encrypted message.

2. The encryption method as claimed in claim 1,
wherein the first hash function is a first keyed hash function,
wherein the first keyed hash function uses a first integrity key.
3. The encryption method as claimed in claim 2, wherein the second hash function is a second keyed hash function,
wherein the second keyed hash function uses a second integrity key,
wherein a third hash function is a third keyed hash function,
wherein the third keyed hash function uses a third integrity key,
wherein the encryption key and at least one of the first, second and third integrity keys are derived from a secret master key.
4. The encryption method as claimed in claim 1,
wherein the second hash function for computing the initialization vector is a second keyed hash function,
wherein the second keyed hash function uses a second integrity key.
5. The encryption method as claimed in claim 1,
wherein generating the output encrypted message comprises generating the message integrity value by encrypting the integrity value using a derived key,
wherein the derived key is generated based on the encrypted data,
wherein the derived key is generated using a third hash function.
6. The encryption method as claimed in claim 5,
wherein the third hash function is a third keyed hash function,
wherein the third keyed hash function uses a third integrity key.
7. The encryption method as claimed in claim 1,
wherein at least one of the first hash function and the second hash function comprises computing a digital signature,
wherein the digital signature is based on a signature key.
8. The encryption method as claimed in claim 1, further comprising:
determining an amount of the input data; and
adding padding data to the input data when the amount is below a predetermined threshold.
9. The encryption method as claimed in claim 8,
wherein the predetermined threshold is the length of the encryption key,
wherein the padding data comprises random data.
10. A decryption method comprising:
obtaining an encrypted message,
wherein the encrypted message comprises an encrypted data and a message integrity value,
wherein the message integrity value is based on an integrity value;
computing an initialization vector based on the integrity value and an associated data using a second hash function,
wherein the associated data is associated with the encrypted message,
wherein the initialization vector is different from the integrity value,
wherein the initialization vector is not included in the encrypted message;
decrypting the encrypted data to generate plaintext using the initialization vector and a decryption key;
computing a test integrity value based on the plaintext using a first hash function; and determining an integrity by comparing the test integrity value and the integrity value.

11. The decryption method as claimed in claim 10,
wherein the first hash function for computing the test integrity value is a first keyed hash function,
wherein the first keyed hash function uses a first integrity key.

12. The decryption method as claimed in claim 10,
wherein the second hash function for computing the initialization vector is a second keyed hash function,
wherein the second keyed hash function uses a second integrity key.

13. The decryption method as claimed in claim 10,
wherein receiving the encrypted message comprises generating the integrity value by decrypting the message integrity value using a derived key,
wherein the derived key is generated based on the encrypted data,
wherein the derived key is generated using a third hash function.

14. The decryption method as claimed in claim 13,
wherein the third hash function is a third keyed hash,
wherein the third keyed hash function uses function using a third integrity key.

15. An encryption device comprising:
an output circuit,
   wherein the output circuit is arranged to provide an output encrypted message,
   wherein the output encrypted message comprises encrypted data and a message integrity value,
   wherein the message integrity value is based on an integrity value; and
an encryption processor circuit, the encryption processor circuit comprising:
a first hash circuit,
   wherein the first hash circuit is arranged to compute the integrity value based on an input data;
a second hash circuit,
   wherein the second hash circuit is arranged to compute an initialization vector based on the integrity value and an associated data,
   wherein the initialization vector is different from the integrity value,
   wherein the initialization vector is not included in the output encrypted message,
   wherein the associated data is associated with the output encrypted message; and
an encryption circuit,
   wherein the encryption circuit is arranged to encrypt the input data so as to generate the encrypted data using the initialization vector and an encryption key.

16. The encryption device as claimed in claim 15,
wherein the first hash circuit is a first keyed hash circuit,
wherein the first keyed hash circuit uses a first integrity key.

17. The encryption device as claimed in claim 16,
wherein the second hash circuit is a second keyed hash circuit,
wherein the second keyed hash circuit uses a second integrity key.

18. A decryption device comprising:
an input circuit,
   wherein the input circuit is arranged to obtain an encrypted message,
   wherein the encrypted message comprises an encrypted data and a message integrity value,
   wherein the message integrity value is based on an integrity value; and
a decryption processor circuit, the decryption processor circuit comprising:
a second hash circuit,
   wherein the second hash circuit is arranged to compute an initialization vector based on the integrity value and an associated data,
   wherein the associated data is associated with the encrypted message,
   wherein the initialization vector is different from the integrity value,
   wherein the initialization vector is not included in the encrypted message; and
a decryption circuit,
   wherein the decryption circuit is arranged to decrypt the encrypted data to generate plaintext using the initialization vector and a decryption key;
a first hash circuit, wherein the first hash circuit is arranged to compute a test integrity value based on the plaintext; and
a comparator circuit, wherein the comparator circuit is arranged to determine the integrity by comparing the test integrity value and the integrity value.

19. The decryption device as claimed in claim 18,
wherein the first hash circuit is a first keyed hash circuit,
wherein the first keyed hash circuit uses a first integrity key.

20. The decryption device as claimed in claim 19,
wherein the second hash circuit is a second keyed hash circuit,
wherein the second keyed hash circuit uses a second integrity key.

21. A non-transitory computer-readable medium on which a computer program is stored, wherein the computer program when executed on a processor performs an encryption method, comprising:
computing an integrity value based on an input data using a first hash function;
computing an initialization vector based on the integrity value and an associated data using a second hash function, wherein the initialization vector is different from the integrity value;
encrypting the input data to generate encrypted data using the initialization vector and an encryption key; and
generating an output encrypted message,
   wherein the output encrypted message comprises the encrypted data and a message integrity value,
wherein the output encrypted message does not comprise the initialization vector,
wherein the message integrity value is based on the integrity value,
wherein the associated data is associated with the output encrypted message.

* * * * *